(12) United States Patent
Kumari et al.

(10) Patent No.: US 12,143,944 B2
(45) Date of Patent: Nov. 12, 2024

(54) ADAPTIVE RADAR WITH PUBLIC SAFETY MESSAGE INTEGRATION

(71) Applicant: QUALCOMM Incorporated, San Diego, CA (US)

(72) Inventors: Preeti Kumari, San Diego, CA (US); Anantharaman Balasubramanian, San Diego, CA (US); Kapil Gulati, Belle Mead, NJ (US); Dan Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 17/466,720

(22) Filed: Sep. 3, 2021

(65) Prior Publication Data
US 2023/0074360 A1  Mar. 9, 2023

(51) Int. Cl.
*H04W 52/34* (2009.01)
*G01S 7/282* (2006.01)
*G01S 7/35* (2006.01)
*G01S 13/931* (2020.01)
*G08G 1/16* (2006.01)
*H04W 4/40* (2018.01)

(52) U.S. Cl.
CPC .......... *H04W 52/34* (2013.01); *G01S 13/931* (2013.01); *H04W 4/40* (2018.02); *G01S 7/282* (2013.01); *G01S 7/35* (2013.01); *G01S 2013/9316* (2020.01); *G08G 1/16* (2013.01)

(58) Field of Classification Search
None
See application file for complete search history.

(56) References Cited

U.S. PATENT DOCUMENTS 6,137,434 A  10/2000  Tohya et al.
10,558,224 B1 *  2/2020  Lin .......................... H04W 4/40
(Continued)

OTHER PUBLICATIONS

International Search Report and Written Opinion—PCT/US2022/074509—ISA/EPO—Nov. 21, 2022.

*Primary Examiner* — Bernarr E Gregory
(74) *Attorney, Agent, or Firm* — Holland & Hart LLP/Qualcomm Incorporated

(57) ABSTRACT

Methods, systems, and devices for wireless communication are described. A communication device (e.g., a vehicle) in wireless communications system (e.g., a cellular-vehicle-to-everything (V2X) system) may support adaptive radar transmissions based on information received in a public safety message. The communication device may use information included in the public safety message to adapt radar transmissions to enable timely detection of vulnerable road users (VRUs). In some examples, based on a location and a velocity estimate provided in the public safety message, the communication device may adjust the radar transmissions to experience a trade-off between range and velocity estimation performance. Additionally or alternatively, based on positional accuracy estimates provided in the public safety message, the communication device may adjust the radar transmissions to improve beamforming. By adapting the radar transmissions, the communication device may experience low latency and high reliability for VRU collision warnings in the C-V2X system.

29 Claims, 12 Drawing Sheets

(56) References Cited

U.S. PATENT DOCUMENTS

| | | | |
|---|---|---|---|
| 2002/0003488 A1* | 1/2002 | Levin | G01S 13/931 |
| | | | 342/60 |
| 2005/0179584 A1 | 8/2005 | Ohlsson | |
| 2006/0262007 A1 | 11/2006 | Bonthron et al. | |
| 2007/0164896 A1* | 7/2007 | Suzuki | G01S 13/931 |
| | | | 342/146 |
| 2010/0198513 A1* | 8/2010 | Zeng | G01S 13/931 |
| | | | 701/300 |
| 2019/0082313 A1 | 3/2019 | Kerselaers et al. | |
| 2019/0096242 A1 | 3/2019 | Gao | |
| 2020/0326407 A1 | 10/2020 | McCloskey et al. | |

* cited by examiner

ADAPTIVE RADAR WITH PUBLIC SAFETY MESSAGE INTEGRATION

FIELD OF TECHNOLOGY

The following relates to wireless communication, including adaptive radar with public safety message integration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as UE. The wireless multiple-access communications system may also be referred to as a vehicle-to-everything (V2X) system, a vehicle-to-vehicle (V2V) system, or a cellular V2X (C-V2X) system. In some cases, one or more of the communication devices may support signaling to provide safety for vulnerable road users (VRUs) (e.g., pedestrians, bicycle riders, road construction crews) in the wireless multiple-access communications system, such as in the C-V2X system. In some other cases, one or more of the communication devices may support radar-based sensing for detecting the VRUs in the wireless multiple-access communications system, such as in the C-V2X system.

SUMMARY

Various aspects of the present disclosure relate to enabling a communication device (e.g., a vehicle) in a wireless communications system (e.g., a C-V2X system) to support adaptive radar-based sensing. For example, the communication device may receive, from another communication device associated with a VRU in the wireless communications system, a radio frequency broadcast message, such as a public safety message (e.g., a C-V2X message). The communication device may adapt at least one parameter of a set of parameters associated with radar-based sensing by the communication device to enable early detection of the other communication device associated with the VRU. For example, the communication device may determine a distance between the communication device (e.g., the vehicle) and the other communication associated with the VRU, and based on the determined distance, adapt at least one parameter of associated with radar-based sensing by the communication device. By adapting the radar-based sensing, the communication device may experience low latency and high reliability for VRU collision warning in the C-V2X system.

A method for wireless communication at a first device in a wireless communications system is described. The method may include receiving, from a second device in the wireless communications system, a radio frequency broadcast message indicating a presence of the second device, determining a distance between the first device and the second device based on the radio frequency broadcast message, adjusting, based on the determined distance between the first device and the second device, at least one parameter of a set of parameters associated with radar-based sensing by the first device, and transmitting a radar signal based on the adjusted at least one parameter of the set of parameters.

An apparatus for wireless communication at a first device in a wireless communications system is described. The apparatus may include a processor, memory coupled with the processor, and instructions stored in the memory. The instructions may be executable by the processor to cause the apparatus to receive, from a second device in the wireless communications system, a radio frequency broadcast message indicating a presence of the second device, determine a distance between the first device and the second device based on the radio frequency broadcast message, adjusting, base at least in part on the determined distance between the first device and the second device, at least one parameter of a set of parameters associated with radar-based sensing by the first device, and transmit a radar signal based on the adjusted at least one parameter of the set of parameters.

Another apparatus for wireless communication at a first device in a wireless communications system is described. The apparatus may include means for receiving, from a second device in the wireless communications system, a radio frequency broadcast message indicating a presence of the second device, means for determining a distance between the first device and the second device based on the radio frequency broadcast message, means for adjusting, based on the determined distance between the first device and the second device, at least one parameter of a set of parameters associated with radar-based sensing by the first device, and means for transmitting a radar signal based on the adjusted at least one parameter of the set of parameters.

A non-transitory computer-readable medium storing code for wireless communication at a first device in a wireless communications system is described. The code may include instructions executable by a processor to receive, from a second device in the wireless communications system, a radio frequency broadcast message indicating a presence of the second device, determine a distance between the first device and the second device based on the radio frequency broadcast message, adjusting, base at least in part on the determined distance between the first device and the second device, at least one parameter of a set of parameters associated with radar-based sensing by the first device, and transmit a radar signal based on the adjusted at least one parameter of the set of parameters.

DETAILED DESCRIPTION

Figure 1:
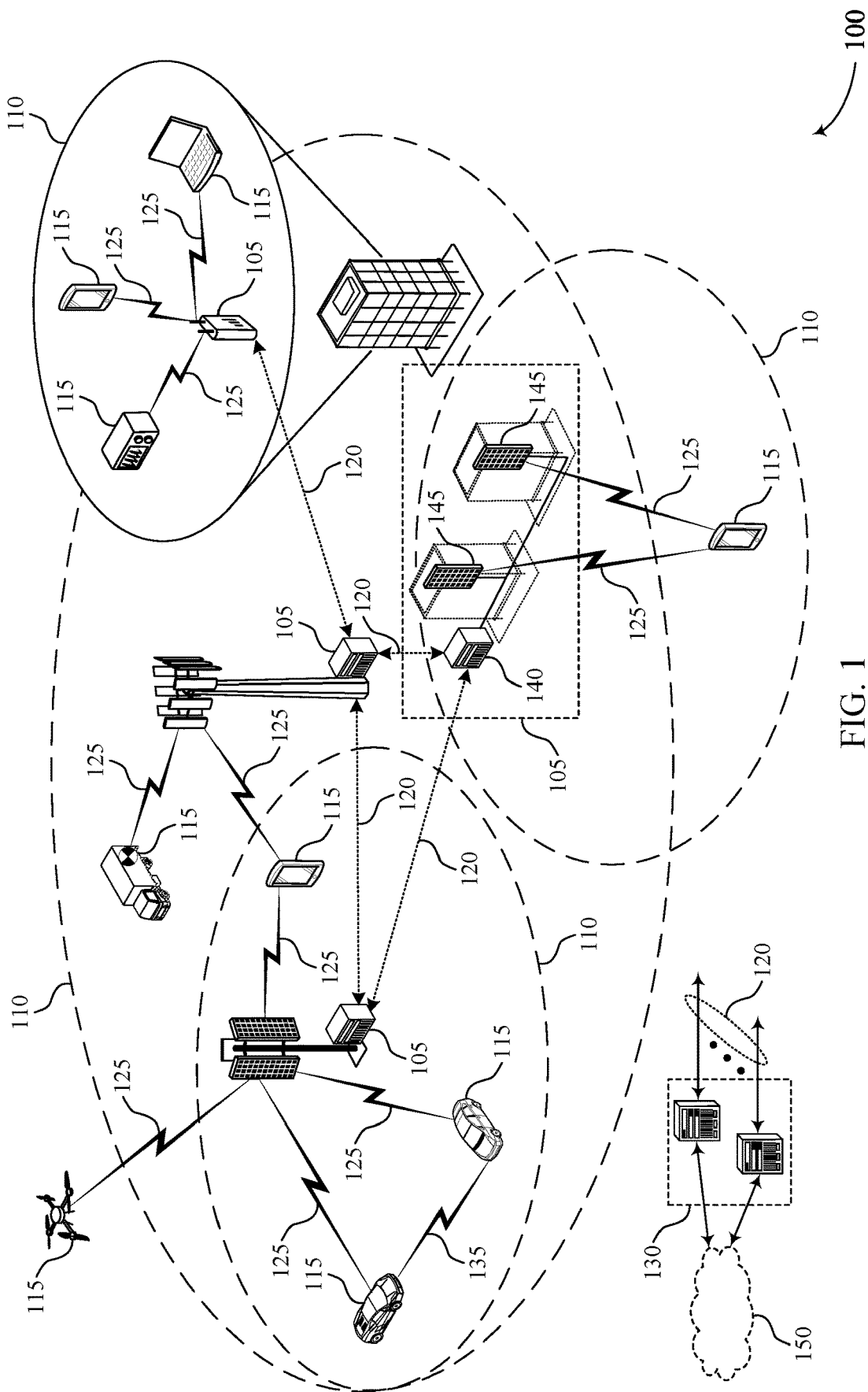
FIGS. 1 through 3 illustrate examples of wireless communications systems that support adaptive radar with public safety message integration in accordance with aspects of the present disclosure.

A wireless communications system may include multiple communication devices supporting various signaling to manage user safety within the wireless communications system. In some examples, these communication devices may support signaling to increase road safety for vulnerable road users (VRUs) (e.g., pedestrians, cyclists, construction crews) by informing other surrounding communication devices (e.g., vehicles) of one or more parameters (e.g., a location, a velocity, a size, or the like) corresponding to the VRUs. For example, a UE may improve VRU safety by broadcasting public safety messages to announce a VRU's presence to approaching vehicles in the wireless communications system, such as a C-V2X system. The public safety message may include one or multiple data fields to help the vehicles avoid collisions with the VRU. In some cases, the public safety message broadcasts may have an associated coverage area of 500 meters and can be received through both line-of-sight (LOS) and non-line-of-sight (NLOS), allowing vehicles within a wide area and in differing environments to be notified of the VRU's presence. However, the update rate for public safety messages might be relatively low (e.g., 1 Hz) and the positioning information conveyed using the public safety messages may be associated with poor accuracy.

In some cases, a communication device (e.g., a vehicle) may employ one or more detection mechanisms (e.g., radar). For example, a communication device may be configured with a radar for transmitting radar signals to sense an environment. The radar signal may be reflected by surrounding objects, where radar signal echoes may be received at the radar receiver in a full-duplex configuration. The reflected radar signal may be processed to estimate a range, a velocity, or angle parameters associated with surrounding targets, among other examples. In some cases, position and velocity estimates performed by the radar may be associated with high accuracy due to wide available bandwidth, use of antenna arrays, and long coherent processing intervals. Additionally, the update rate may be higher than other VRU safety features (e.g., public safety messaging). In some cases, the radar may have a smaller spatial coverage than public safety messaging due to larger path-loss and limited field-of-view. Additionally, radar processing may limit sensing in NLOS and blockage scenarios, and may exhibit poor data association, clustering, and object classification, and may utilize low-speed analog-to-digital converters.

Various aspects of the present disclosure relate to enabling a UE configured with a radar to support adaptive radar transmissions based on information received from a public safety message (e.g., within a C-V2X system) for high accuracy C-V2X VRU collision warning. By leveraging a spatial coverage area of public safety message broadcasts, the UE (e.g., a vehicle) may adapt one or more parameters associated with the radar to enable earlier detection of a VRU in the C-V2X system, which may yield more detailed location data and prevent collisions with the VRU. In some examples, the UE may adapt parameters that may permit a tradeoff between range and velocity estimates based on the public safety message broadcast. In some other examples, the public safety message broadcast may be used by the UE (e.g., the vehicle) to adapt transmission beamforming. Additionally or alternatively, the UE (e.g., the vehicle) may adapt one or more parameters associated with the radar based on a user type, an activity, a number of participants in a cluster, as well as a user size and behavior characteristics provided by the public safety message broadcast. Lastly, based on the public safety broadcast, the UE (e.g., the vehicle) may plan one or more adaptive radar action sequences over several time intervals in the future as described herein.

Adaptive radar transmissions based on information received from a public safety message may improve estimation accuracies of states and predictions associated with VRUs, as well as provide low latency detection of VRUs. Additionally, leveraging public safety messages may provide extended reaction times for vehicles in the vicinity of VRUs, which may increase the amount of prevented collisions and provide better estimates of whether a VRU may be provided with a collision warning.

Aspects of the disclosure are initially described in the context of wireless communications systems. Aspects of the disclosure are further illustrated by and described with reference to apparatus diagrams, system diagrams, and flowcharts that relate to adaptive radar with public safety message integration.

FIG. 1 illustrates an example of a wireless communications system 100 that supports adaptive radar with public safety message integration in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may correspond to a VRU (e.g., pedestrian, cyclist, construction crews) operating in locality of other UEs 115. In some examples, the UE 115 may be a cellular device, a bike mounted hardware, a construction equipment (e.g., cones), and the like. When the UE 115 operates in a high traffic area in the wireless communications system 100, where the traffic may include other UEs (e.g., vehicles, and the like), the UE 115 may use one or more safety features to alert surrounding UEs 115 of a VRU corresponding to the UE 115. For example, a UE 115 may correspond to a pedestrian walking on a sidewalk adjacent to a road utilized by vehicles. The UE 115 may broadcast information, such as a physical position, a velocity, an acceleration, a user size and behavior, a path history, or the like, to increase a safety of a VRU associated with the UE 115 by alerting surrounding devices (e.g., vehicles) of the aforementioned information. By transmitting information associated with the VRU, surrounding UEs 115 may account for the presence of the VRU and prevent possible collisions between the surrounding devices and the VRU.

In some cases, public safety message broadcasts may be associated with a large spatial coverage area (e.g., 500 m), however the information included in the public safety message broadcast may be associated with low accuracy, and the update rate corresponding to public safety messages may be relatively slow (e.g., 1 Hz). That is, while public safety messaging provides early indications of nearby VRUs, public safety messaging may not provide the resolution to adequately and safely avoid collisions with the nearby VRUs. Vehicles may also implement techniques to avoid collisions with VRUs, such as detection techniques (e.g., radar), allowing vehicles to detect and avoid potential collisions with VRUs.

An automotive radar may send a transmit radar signal to sense an environment. That is, the automotive radar may transmit a radar signal, where the radar signal is reflected by surrounding objects (e.g., VRUs). The automotive radar may detect the reflected radar signals and subsequently process the reflected radar signals to estimate a range, a velocity, and an angle corresponding to surrounding objects. The detection and acquisition of objects via radar may provide high accuracy positioning information, as well as velocity, acceleration, and angular information (e.g., height and azimuth). Additionally, radar may have an update rate that is relatively higher than public safety messaging, providing more reliable and up-to-date data corresponding to surrounding objects.

Some radars (e.g., millimeter-wave radars) may measure location with an accuracy on the cm-level for range, decimeter-per-second level accuracy for velocity, and around 1-degree angular resolution with a high update rate (e.g., 100 Hz). However, radar may also correspond to lower spatial coverage (e.g., 100 m) due to larger path-loss and limited field-of-view. For example, traditional radar processing limits its sensing in non-line of sight and blockage scenarios. That is, automotive radar detection may start relatively late (e.g., when the vehicle is roughly 100 m away from a VRU and a few seconds away from a potential collision) due to higher path-loss, small radar cross-section, and narrow field-of-view. Additionally, radar may suffer from poor data association, clustering, and object classification.

The techniques described within the present disclosure provide techniques for leveraging suitable aspects from both public safety message broadcasts and radar detection to realize improved VRU safety (e.g., earlier detection, enhance collision avoidance). For example, a vehicle may receive a public safety message corresponding to a VRU approximately 500 m away, well before the VRU would be within an effective radar range. Based on the information within the public safety message, the vehicle may adapt one or more parameters (e.g., transmit power) to increase the radar SNR and, therefore, detection range. By increasing detection range, the vehicle may acquire the VRU earlier, which in turn increases the reaction time for collision avoidance.

In some cases, the radar may utilize a lower carrier frequency to reduce attenuation due to path-loss, which may further increase the effective range of the radar. Additionally or alternatively, the vehicle may utilize the coarse location data associated with the public safety message to steer the radar aboard the vehicle to the last known location of the VRU. By leveraging coarse information provided by the public safety message, which may be detected earlier than radar signatures, the public safety message information may act as an early warning calibration system for the radar on board the vehicle, which may result in earlier detection of VRUs, elongated reaction times before collisions, more reliable object classification, and the like.

Figure 2:
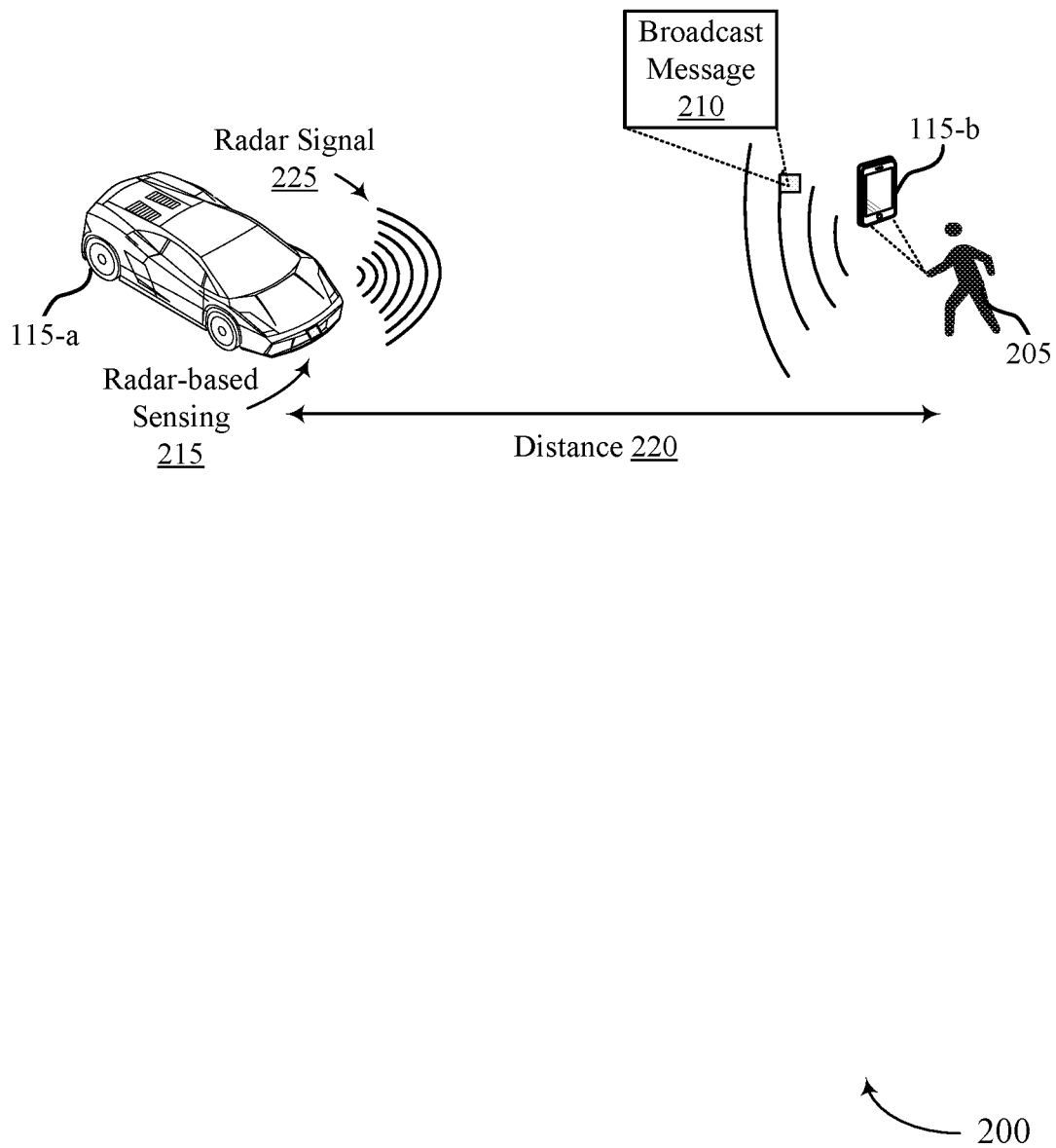

FIG. 2 illustrates an example of a wireless communications system 200 that supports adaptive radar with public safety message integration in accordance with aspects of the present disclosure. The wireless communications system 200 may implement or be implemented by one or more aspects of the wireless communications system 100. For example, the wireless communications system 200 may include a UE 115-*a* and a UE 115-*b*, which may be examples of devices as described with reference to FIG. 1. In some cases, the wireless communications system 200 may implement or be implemented by a C-V2X system, where the UE 115-*a* may be associated with a vehicle in the C-V2X system and the UE 115-*b* may be associated with a VRU 205 in the C-V2X system. It should be noted that, while certain examples are discussed below, that any number of devices, device types, or signaling may be supported in any order to accomplish techniques disclosed in the present disclosure.

In the example of FIG. 2, the VRU 205 (e.g., a pedestrian) may be in a vicinity of the UE 115-*a*. For example, the VRU 205 may be on a sidewalk adjacent to a road that the UE 115-*a* is traveling along. In some cases, the UE 115-*b* associated with the VRU 205 may transmit a broadcast message 210 to inform nearby devices of the presence of the VRU 205. In some cases, the UE 115-*a* may receive the broadcast message 210 when within a threshold distance from the VRU 205. In some cases, when the UE 115-*a* is within a threshold distance (e.g., a range to receive the broadcast message 210) from the VRU 205, the UE 115-*a* may receive the broadcast message 210 and use information included in the broadcast message 210 to adapt one or more parameters to enable early radar-based sensing 215 by the UE 115-*a*. For example, the UE 115-*a* may receive the broadcast message 210 when the UE 115-*a* is within 500 m from the VRU 205. The UE 115-*b* associated with the VRU 205 may periodically update information included in the broadcast message 210 (e.g., location information, velocity information, acceleration information) at a rate (e.g., 1 Hz). In some cases, the information included in the broadcast message 210 may have low accuracy (e.g., location information might be accurate by 7 m), which, if used alone, may be associated with less reliable VRU collision detection performance.

The UE 115-*a* may enable adaptive radar-based sensing 215 based on information received in the broadcast message 210 (e.g., a C-V2X message) for high accuracy C-V2X VRU collision warning in the wireless communications system 200. Based at least in part on adapting radar-based sensing 215 including radar transmissions and processing of received reflections, detection and estimation accuracies corresponding to a state and predicted behavior of the VRU 205 may be improved. For example, adaptive radar-based sensing 215 may provide an improved sense of whether the VRU 205 may be provided a warning of collision with the UE 115-*a*. Based on adaptive radar-based sensing 215, the broadcast message 210 may be adapted to enhance safety of the VRU 205. For example, the UE 115-*a* may receive, from the UE 115-*b*, the broadcast message 210 (e.g., a radio frequency broadcast message) indicating the presence of the VRU 205.

The UE 115-*a* may use the broadcast message 210 to determine a distance 220 between the UE 115-*a* and the VRU 205. Based on the broadcast message 210 and the determined distance 220, the UE 115-*a* may adjust at least one parameter of a set of parameters associated with radar-based sensing 215 at the UE 115-*a* and subsequently transmit a radar signal 225. In other words, by utilizing the broader coverage area of the broadcast message 210, the UE 115-*a* may utilize information included in the broadcast message 210 to adapt one or more parameters such that the VRU 205 may be detected earlier and more accurately. For example, based on the distance estimate obtained using location information provided by the broadcast message 210, the UE 115-*a* may adapt one or more parameters to enable better detection and tracking of the VRU 205. Based on the information provided by the broadcast message 210, the UE 115-*a* may increase radar transmit power for the VRU 205 at longer distances (e.g., above a distance threshold). By implementing an increased radar transmit power and subsequently performing a transmission corresponding to the radar-based sensing 215, the UE 115-*a* may increase a SNR and detection range associated with the radar signal 225, which may result in early and more reliable detection of the VRU 205.

Additionally or alternatively, the UE 115-*a* may select, and subsequently transmit, a lower carrier frequency for the radar signal 225 to decrease path loss. In some cases, the UE 115-*a* may select a lower carrier frequency for the radar signal 225 as compared to a current carrier frequency of a component carrier associated with the radar-based sensing 215. Additionally or alternatively, the UE 115-*a* may adjust (e.g., increase) a radar update rate for the VRU 205. The UE 115-*a* may increase the radar update rate at short distance, which may enable low-latency safety when the VRU 205 is close by (e.g., when the distance between the UE 115-*a* and the VRU 205 is below a threshold). In some examples, the UE 115-*a* may increase a number of radio frequency digital chains for VRU detection at long distances. By doing so, the UE 115-*a* may increase angular resolution for multi-target scenarios (e.g., more than one VRU 205). The UE 115-*a* may also increase a bandwidth corresponding to the radar-based sensing 215 at short distances, which may increase a range resolution corresponding to the radar signal 225 and better enable object classification at the UE 115-*a*. Additionally or alternatively, the UE 115-*a* may decrease beam width associated with the radar signal 225 to enable VRU detection at long distances (e.g., based on a distance being greater than a threshold). By doing so, the UE 115-*a* may increase the radar SNR and the detection range.

In some cases, based on location and velocity estimates provided by the broadcast message 210, the UE 115-*a* may adapt one or more parameters for a radar associated with the radar-based sensing 215 to permit a trade-off between range and velocity performance. In radars, such as pulse radars and frequency modulated continuous wave radars, there may be a trade-off between maximum achievable unambiguous range and maximum achievable unambiguous velocity. The UE 115-*a* may use either side of this trade-off depending on a given scenario. For example, at short range, the UE 115-*a* may decrease a pulse repetition interval of the radar for increasing maximum velocity estimation of the VRU 205. For example, the pulse repetition interval of the radar-based sensing 215 may be adjusted based at least in part on an identified geolocation, identified velocity, and the radar including a pulse radar, or a frequency modulated continuous wave radar. Based on the adjusted pulse interval, the UE 115-*a* may transmit the radar signal 225. Conversely, for targets far away, the UE 115-*a* may elongate the pulse repetition interval for the VRU 205 when the VRU 205 is far away (e.g., above a threshold distance) and has a small velocity (e.g., below a threshold velocity).

Based on a positional accuracy estimate provided by the broadcast message 210, the UE 115-*a* may adapt transmission beamforming corresponding to the radar-based sensing 215. For example, the UE 115-*a* may adapt the radar signal 225 to be more focused in the direction of the VRU 205 to increase radar estimation accuracy during a radar tracking mode. That is, the UE 115-*a* may identify a positioning accuracy based on the broadcast message 210 and subsequently adjust one or more parameters associated with the radar-based sensing 215. The UE 115-*a* may adjust the one or more parameters until a positioning accuracy error threshold corresponding to the VRU 205 is satisfied. In some cases, the UE 115-*a* may enter a radar tracking mode, where radar transmission gain and field of view may be increased to accommodate the positioning accuracy threshold based on the broadcast message 210 (e.g., poor positional accuracy included in the broadcast message 210).

Figure 3:
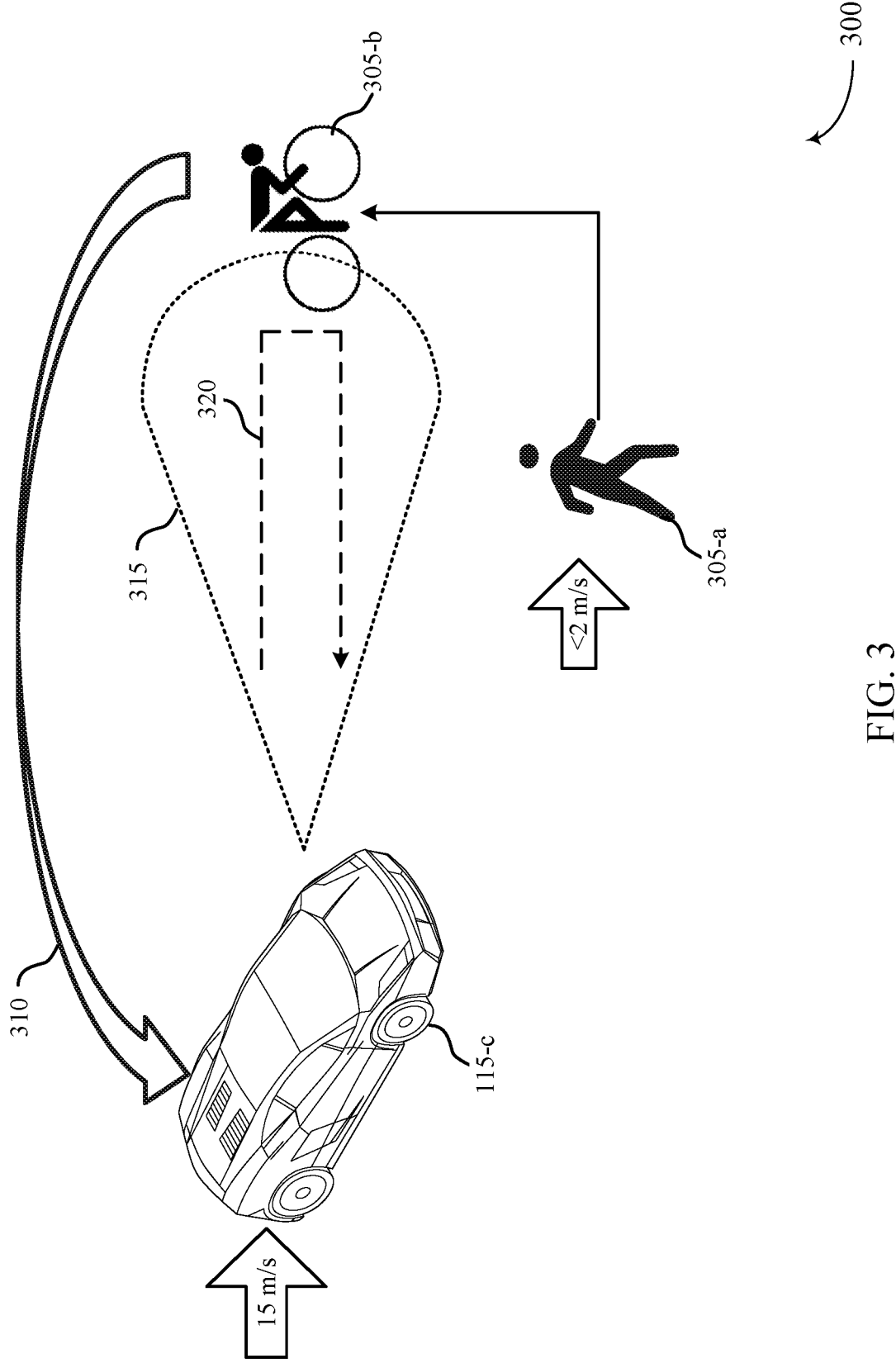

FIG. 3 illustrates an example of a wireless communications system 300 that supports adaptive radar with public safety message integration in accordance with aspects of the present disclosure. The wireless communications system 300 may implement or be implemented by one or more aspects of the wireless communications system 100 and the wireless communications system 200. For example, the wireless communications system 300 may include a UE 115-*c*, which may be examples of a device as described with reference to FIGS. 1 and 2. In some examples, the wireless communications system 300 may implement or be implemented by a C-V2X system and the UE 115-*c* may be associated with a vehicle in the C-V2X system.

In the example of FIG. 3, the wireless communications system 300 (e.g., a C-V2X system) may include one or more VRUs, such as a VRU 305-*a* (e.g., a pedestrian walking on a sidewalk) and a VRU 305-*b* (e.g., a cyclist). The VRU 305-*a* may be associated with a respective UE and the VRU 305-*b* may be associated with another respective UE. Each respective UE may support wireless communication in the wireless communications system 300. For example, each respective UE may broadcast a public safety message (e.g., a C-V2X message) to inform a presence of the VRU 305-*a* or the VRU 305-*b* to other UEs, such as the UE 115-*c*, in the wireless communications system 300. The UE 115-*c* may enable radar-based sensing to sense one or more of the VRU 305-*a* or the VRU 305-*b* based on the broadcasted public safety messages.

The UE 115-*c* may receive a public safety message 310 from the VRU 305-*b*. The UE 115-*c* may determine a distance between the UE 115-*c* and the VRU 305-*b* based at least in part on the received public safety message 310. For example, the UE 115-*c* may identify a geolocation of the VRU 305-*b* and a velocity of the VRU 305-*b* based at least in part on the received public safety message 310. Additionally or alternatively, the UE 115-*c* may adjust at least one parameter associated with radar-based sensing based at least in part on the identified geolocation and velocity of the VRU 305-*b*. In some cases, the UE 115-*c* may determine to adjust, prior to a transmission of a radar signal associated with radar-based sensing, a number of radio frequency chains for a radar associated with the UE 115-*c* (e.g. a vehicle-borne radar) based at least in part on the distance between the UE 115-*c* and the VRU 305-*b*. In some cases, the UE 115-*c* may increase or decrease the number of radio frequency chains to enable high accuracy estimates of the VRU 305-*b* (e.g., velocity, direction traveled, path history).

Additionally or alternatively, the UE 115-*c* may identify, based at least in part on the public safety message 310, one or more user types associated with one or more of the VRU 305-*a* or the VRU 305-*b*, an activity associated with one or more of the VRU 305-*a* or the VRU 305-*b*, a number of devices in a cluster of devices associated with one or more of the VRU 305-*a* or the VRU 305-*b*, a dimension associated with one or more of the VRU 305-*a* or the VRU 305-*b*, or a behavior associated with one or more of the VRU 305-*a* or the VRU 305-*b*. Based at least in part on these identifications, the UE 115-*c* may adjust at least one parameter associated with radar-based sensing. For example, the UE 115-*c* may adjust a field-of-view for a radar associated with the UE 115-*c* (e.g. a vehicle-borne radar) to enable detection of more spatially disparate targets (e.g., VRUs 305). In other examples, the UE 115-*c* may adjust at least one parameter associated with radar-based sensing to enable high accuracy detection of velocities, direction, behavior, and the like to avoid potential collisions with one or more of the VRU 305-*a* or the VRU 305-*b*. For example, the UE 115-*c* may adjust a rate or a transmit power for a radar associated with the UE 115-*c* (e.g. a vehicle-borne radar), and subsequently transmit one or more radar signals for radar-based sensing by the UE 115-*c*.

By way of example, the UE 115-*c* may be traveling at 15 meters per second (m/s) when the public safety message 310 is received at UE 115-*c*. The UE 115-*c* may adapt at least one parameter corresponding to a radar associated with the UE 115-*c* (e.g. a vehicle-borne radar) to improve detection of one or more of the VRU 305-*a* or the VRU 305-*b*. The UE 115-*c* may determine, based on the received public safety message 310, that the VRU 305-*b* is a cyclist traveling parallel to a direction of the UE 115-*c* (e.g., a vehicle associated with the UE 115-*c*). Based on the determination, the UE 115-*c* may modify one or more parameters associated with radar-based sensing at the UE 115-*c*, such that the VRU 305-*b*, which may be within a distance threshold, may be detected and classified at a high accuracy (e.g., above an accuracy threshold). For example, the UE 115-*c* may transmit a radar envelope 315 based on the modified one or more parameters. The UE 115-*c* may measure a time-of-flight corresponding to a reflection 320 of a radar signal to determine a location, a velocity, a projected path, or the like, corresponding to the VRU 305-*b*.

In some cases, the UE 115-*c* may receive an indication from the VRU 305-*a* (e.g., traveling at <2 m/s), which may correspond to a pedestrian walking on a sidewalk. For example, the VRU 305-*a* may transmit a broadcast message (e.g., a public safety message) including a request to cross indicator indicating the VRU 305-*a*'s intent to cross a street, which may be used by the UE 115-*c* (e.g., a vehicle associated with the UE 115-*c*) and the VRU 305-*b*. In some cases, the UE 115-*c* may receive the public safety message from the VRU 305-*a*, including the request to cross indicator. Based on the received public safety message, the UE 115-*c* may adjust one or more parameters (e.g., a rate or transmit power) for a radar associated with the UE 115-*c* (e.g. a vehicle-borne radar) based at least in part on identifying a user type associated with the VRU 305-*a* (e.g., a pedestrian), an identified dimension of the VRU 305-*a*, an identified behavior of the VRU 305-*a*, or a combination thereof. In some cases, the UE 115-*c* may adjust a coherent processing time interval for a radar associated with the UE 115-c (e.g. a vehicle-borne radar) to boost detection of the VRU 305-b. Based on the adjusted one or more parameters, the UE 115-c may transmit one or more radar envelopes 315 to detect the VRU 305-a.

In some cases, the UE 115-c may previously sense both the VRU 305-a and the VRU 305-b. In such cases, the UE 115-c may determine one or more sequences, where a sequence adapts one or more parameters to enable detection and avoidance of both the VRU 305-a and the VRU 305-b. For example, the UE 115-c may determine that a possible collision may occur with the VRU 305-b (e.g., the cyclist) before arriving at a crosswalk, where the VRU 305-b (e.g., the pedestrian) may attempt to cross. Based on the received public safety message 310, the UE 115-c may identify one or more of a velocity, an acceleration, a heading, a path history, a path prediction, or the like, of one or more of the VRU 305-a or the VRU 305-b. Based on information identified for both the VRU 305-a and the VRU 305-b, the UE 115-c may select a sequence for adjusting one or more parameters for a radar associated with the UE 115-c (e.g. a vehicle-borne radar).

By selecting a sequence for adjusting one or more parameters, the UE 115-c may adapt a first set of parameters for detection and collision avoidance with the VRU 305-b. The UE 115-c may then adapt a second set of parameters within the sequence for detection and collision avoidance with the VRU 305-a. In some cases, based on a velocity, an acceleration, a heading, a path history, a path prediction, a personal crossing request, or a personal crossing in progress provided by the public safety message 310, the UE 115-c may adapt a radar sequence in time to accommodate for various potential collisions at different points in time. For example, the UE 115-c may determine that the VRU 305-b turned off of the road the UE 115-c is traveling on. Upon the UE 115-c determining that there is a minimal or no risk of collision with VRU 305-b, the UE 115-c may adapt the second set of parameters to detect the VRU 305-a.

Based on a public safety message received from the VRU 305-a, the UE 115-c may determine that the VRU 305-a is associated with a personal crossing request or a personal crossing in progress. In response to information gained from the public safety message, the UE 115-c may adapt one or more parameters to enable high accuracy detection of the VRU 305-a to avoid potential collisions during the personal crossing. It should be noted that solutions discussed above in the present disclosure may be part of the sequence as determined by the UE 115-c. The radar may plan an action sequence for several time intervals in the future utilizing one or more methods previously discussed, where the sequences could be one or more combinations of different solutions. By implementing action sequences, the radar is enabled to achieve higher spatial coverage with enhanced sensing in line of sight, non-line of sight, and blockage scenarios before a VRU 305 is in the radar's field-of-view and detection range. In some cases, based on personal crossing requests and personal crossing in progress, the UE 115-c may adapt a radar to track the VRU 305, such as adapting a transmission beam scanning sequence, among other examples.

In some cases, the public safety message 310 may include additional information that the UE 115-c may use to adapt the vehicle-borne radar. For example, the public safety message 310 may indicate a user type, worker activity, number of participants in a cluster, as well as user size and behavior characteristics. Based on the indicated information, the UE 115-c may adjust a radar to adapt a corresponding transmitter for a wide range of scenarios that may be differentiated by the provided information. For example, the radar may adapt a set of parameters if an associated VRU 305 is a child (e.g., with a small radar cross section and height), and use higher transmit power in a given azimuth and elevation corresponding to the child. In another example, if poor behavior characteristics are indicated, the UE 115-c may adapt parameters such that tracking is improved with higher transmit power in a direction, performed for an extended duration, and performed with a high update rate.

Additionally or alternatively, if the public safety message 310 indicates a pedestrian or cyclist, the UE 115-c may accordingly extend a coherent processing interval to better estimate a micro-Doppler signature. The micro-Doppler signature may assist in enhancing detection and classification. As another example, the public safety message 310 may indicate a road construction scenario, which may result in the UE 115-c adapting a wider field-of-view. If the public safety message 310 indicates a user's disability type, the radar tracking could be adapted with a higher update rate and transmit power. Additionally or alternatively, the transmit field-of-view may be improved based on the disability type. Additionally or alternatively, based on a number of participants (e.g., VRUs 305) in a cluster, and a personal cluster radius provided by the public safety message 310, the UE 115-c may adjust the field-of-view for better tracking of the cluster.

Figure 4:
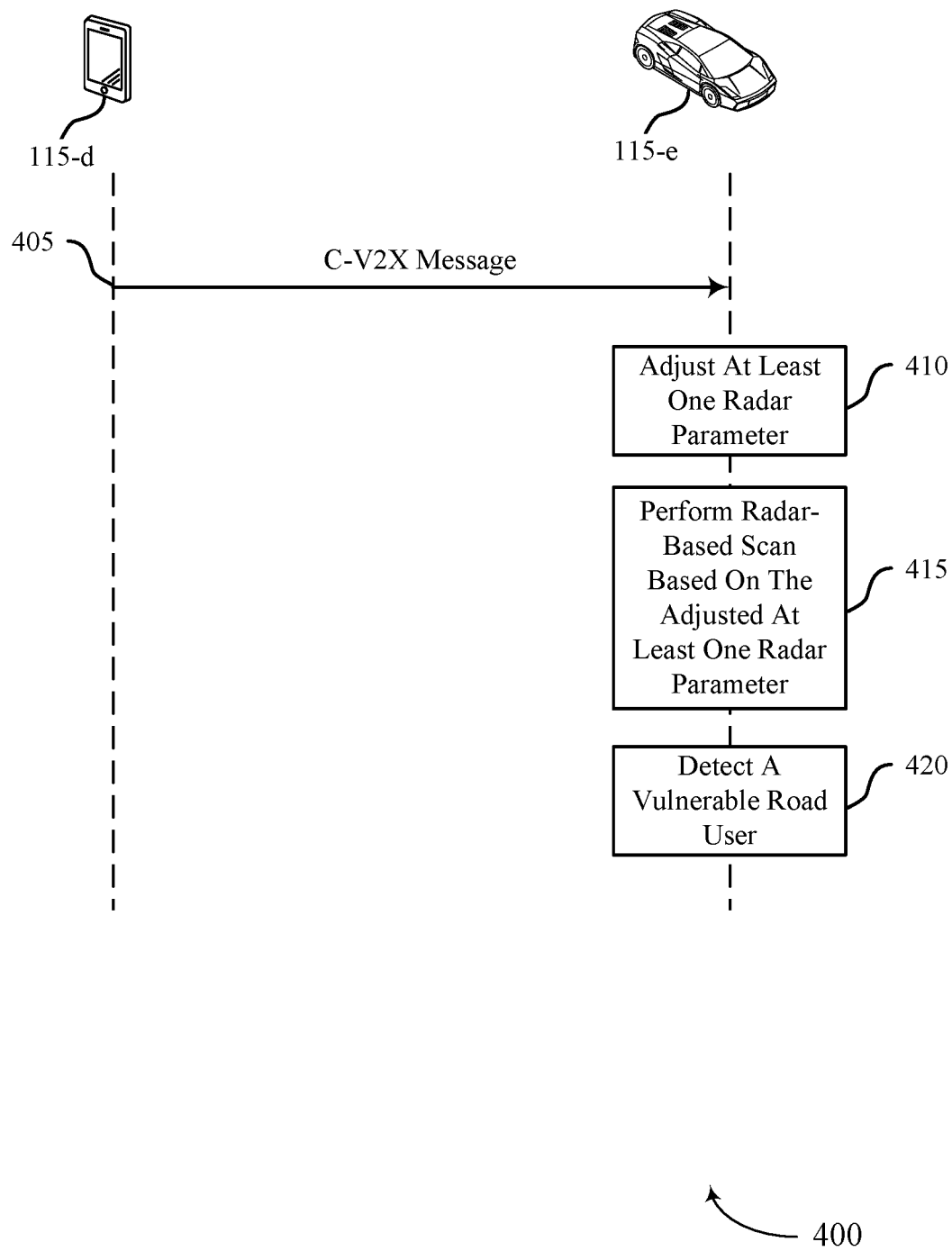
FIG. 4 illustrates an example of a process flow that supports adaptive radar with public safety message integration in accordance with aspects of the present disclosure.

FIG. 4 illustrates an example of a process flow 400 that supports adaptive radar with public safety message integration in accordance with aspects of the present disclosure. The process flow 400 may implement or be implemented by one or more aspects of the wireless communications system 100 and the wireless communications system 200. For example, the process flow 400 may include a UE 115-d and a UE 115-e, which may be examples of devices as discussed with reference to FIG. 1. In the example of FIG. 4, the UE 115-d may be associated with a VRU in a C-V2X system and the UE 115-e may be associated with a vehicle in the C-V2X system. In the following description of the process flow 400, operations between the UE 115-d and the UE 115-e, and the UE 115-d and the UE 115-e may occur in a different order or at different times than as shown. Some operations may also be omitted from the process flow 400, and other operations may be added to the process flow 400.

At 405, the UE 115-d may transmit, to the UE 115-e, a C-V2X message having an appropriate sensing range that may allow the UE 115-e to receive the C-V2X message and timely sense the UE 115-e. For example, the UE 115-d may be associated with a VRU in a C-V2X system and the UE 115-e may be associated with a vehicle in the C-V2X system. By broadcasting the C-V2X message (e.g., a public safety message), the UE 115-e associated with the vehicle may use radar-based sensing to sense the UE 115-d in the C-V2X system to avoid collision with the UE 115-d.

At 410, the UE 115-e may adjust at least one parameter of a set of parameters associated with radar-based sensing based on the received in the C-V2X message. The UE 115-e may determine a distance between the UE 115-d and the UE 115-e, and adjust the at least one parameter associated with radar-based sensing to enable sensing of the UE 115-d associated with the VRU in the C-V2X system. For example, based on the determined distance, the UE 115-e may increase or decrease a transmit power associated with radar-based sensing for extended distance acquisition and tracking of the UE 115-d.

At 415, the UE 115-e may perform a radar-based scan based on the adjusted at least one parameter of the set of parameters associated with radar-based sensing. For example, based on the adjusted at least one parameter, such as an adjusted increased field-of-view, adjusted pulse repetition, adjusted beam width, or the like, the UE 115-*e* may perform the radar-based scan to sense and track the UE 115-*d*. At 420, the UE 115-*e* may detect a VRU associated with the UE 115-*d* based on the radar-based scan.

By enabling the UE 115-*e* to adjust radar-based scanning to detect the UE 115-*d*, the UE 115-*e* may avoid a collision with the UE 115-*d* (e.g., a VRU in a C-V2X system) or inform the UE 115-*d* of an impending collision, or both.

Figure 5:
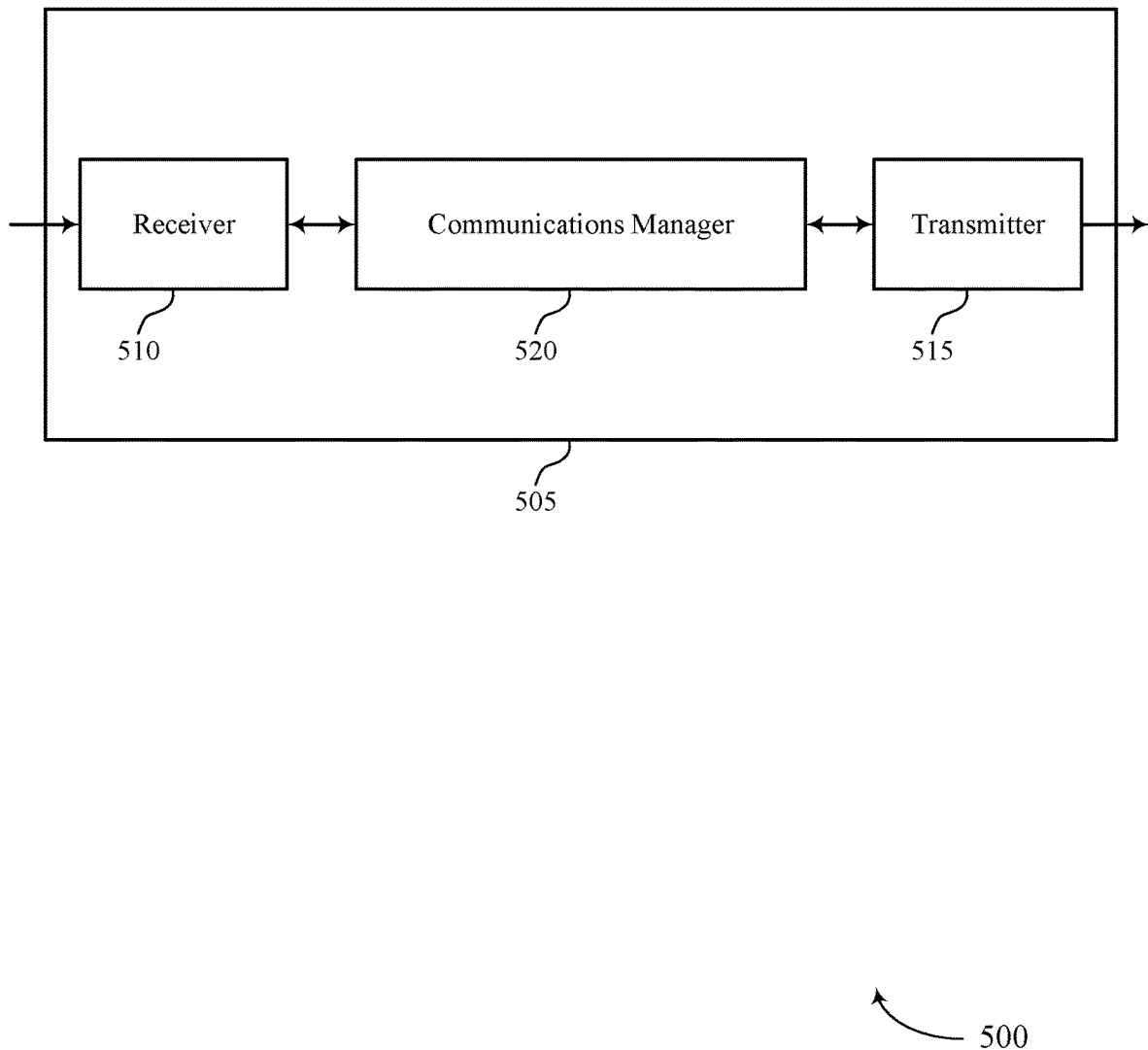
FIGS. 5 and 6 show block diagrams of devices that support adaptive radar with public safety message integration in accordance with aspects of the present disclosure.

FIG. 5 shows a block diagram 500 of a device 505 that supports adaptive radar with public safety message integration in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to adaptive radar with public safety message integration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to adaptive radar with public safety message integration). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of adaptive radar with public safety message integration as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 (e.g., a first device) in a wireless communications system in accordance with examples as disclosed herein. For example, the communications manager 520 may be configured as or otherwise support a means for receiving, from a second device in the wireless communications system, a radio frequency broadcast message indicating a presence of the second device. The communications manager 520 may be configured as or otherwise support a means for determining a distance between the first device and the second device based on the radio frequency broadcast message. The communications manager 520 may be configured as or otherwise support a means for adjusting, basing at least in part on the determined distance between the first device and the second device, at least one parameter of a set of parameters associated with radar-based sensing by the first device. The communications manager 520 may be configured as or otherwise support a means for transmitting a radar signal based on the adjusted at least one parameter of the set of parameters.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption.

Figure 6:
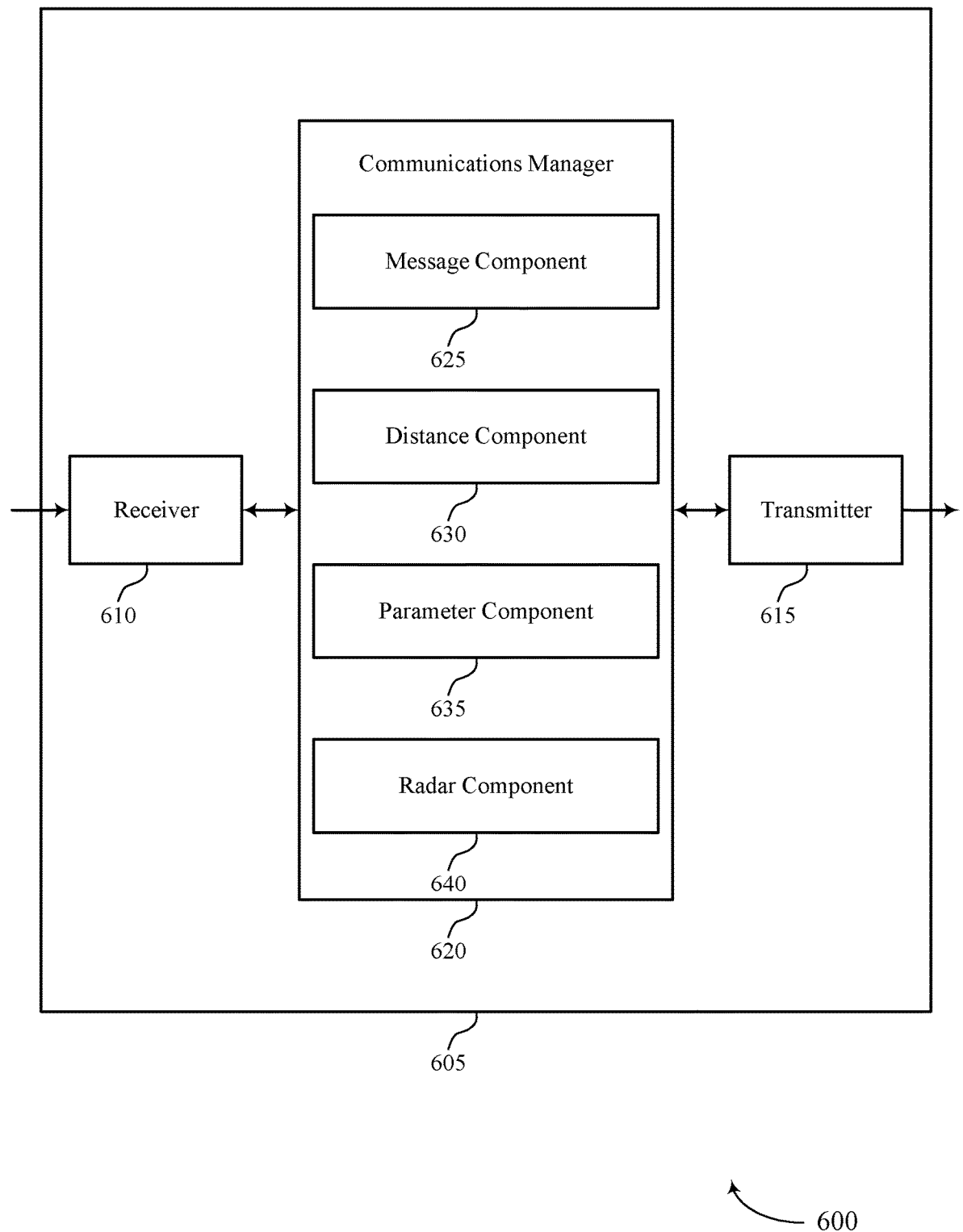

FIG. 6 shows a block diagram 600 of a device 605 that supports adaptive radar with public safety message integration in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to adaptive radar with public safety message integration). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to adaptive radar with public safety message integration). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of adaptive radar with public safety message integration as described herein. For example, the communications manager 620 may include a message component 625, a distance component 630, a parameter component 635, a radar component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a the device 605 (e.g., a first device) in a wireless communications system in accordance with examples as disclosed herein. The message component 625 may be configured as or otherwise support a means for receiving, from a second device in the wireless communications system, a radio frequency broadcast message indicating a presence of the second device. The distance component 630 may be configured as or otherwise support a means for determining a distance between the first device and the second device based on the radio frequency broadcast message. The parameter component 635 may be configured as or otherwise support a means for adjusting, based on the determined distance between the first device and the second device, at least one parameter of a set of parameters associated with radar-based sensing by the first device. The radar component 640 may be configured as or otherwise support a means for transmitting a radar signal based on the adjusted at least one parameter of the set of parameters.

Figure 7:
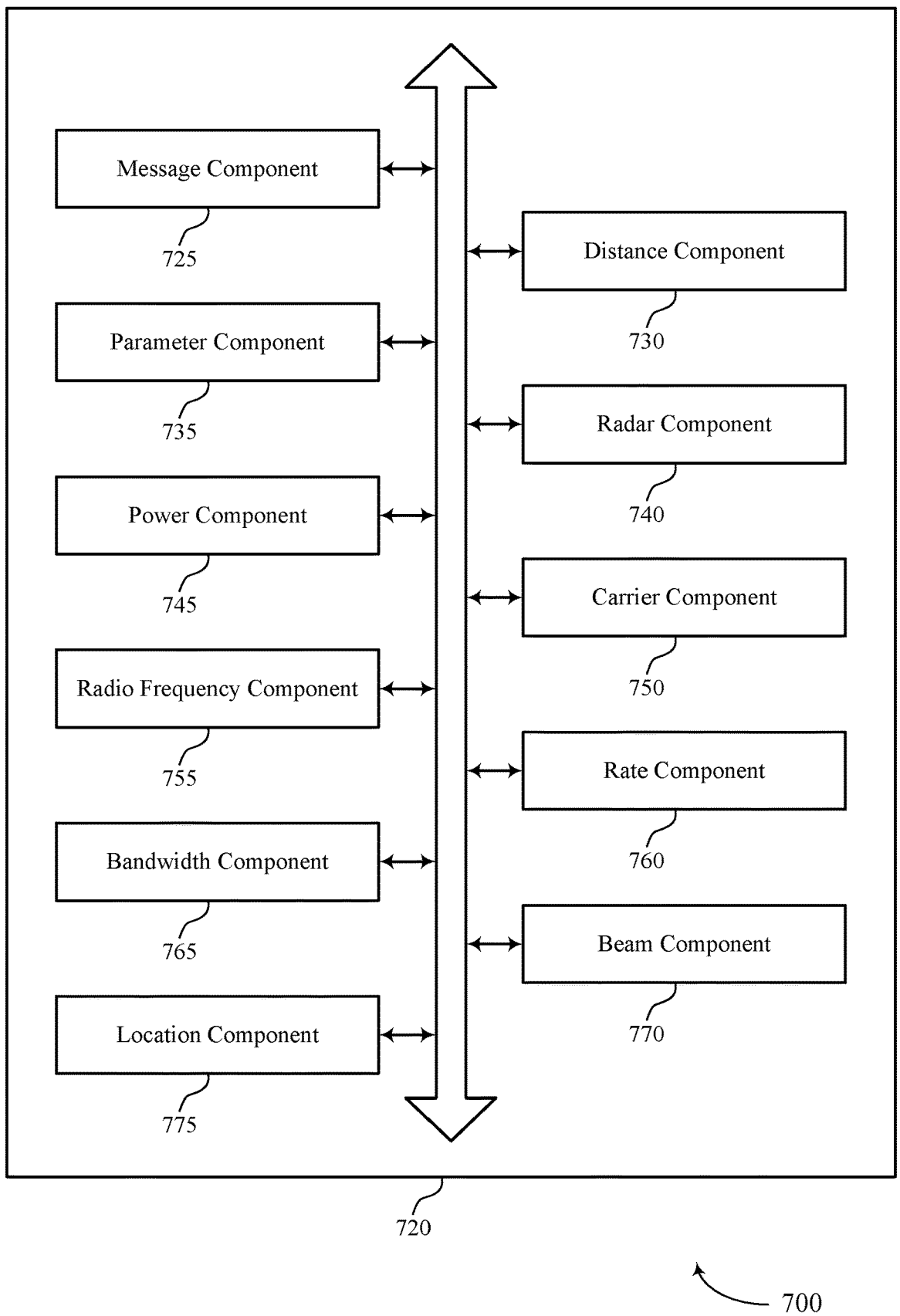
FIG. 7 shows a block diagram of a communications manager that supports adaptive radar with public safety message integration in accordance with aspects of the present disclosure.

FIG. 7 shows a block diagram 700 of a communications manager 720 that supports adaptive radar with public safety message integration in accordance with aspects of the present disclosure. The communications manager 720 may be an example of aspects of a communications manager 520, a communications manager 620, or both, as described herein. The communications manager 720, or various components thereof, may be an example of means for performing various aspects of adaptive radar with public safety message integration as described herein. For example, the communications manager 720 may include a message component 725, a distance component 730, a parameter component 735, a radar component 740, a power component 745, a carrier component 750, a radio frequency component 755, a rate component 760, a bandwidth component 765, a beam component 770, a location component 775, or any combination thereof. Each of these components may communicate, directly or indirectly, with one another (e.g., via one or more buses).

The communications manager 720 may support wireless communication at a first device in a wireless communications system in accordance with examples as disclosed herein. The message component 725 may be configured as or otherwise support a means for receiving, from a second device in the wireless communications system, a radio frequency broadcast message indicating a presence of the second device. The distance component 730 may be configured as or otherwise support a means for determining a distance between the first device and the second device based on the radio frequency broadcast message. The parameter component 735 may be configured as or otherwise support a means for adjusting, based on the determined distance between the first device and the second device, at least one parameter of a set of parameters associated with radar-based sensing by the first device. The radar component 740 may be configured as or otherwise support a means for transmitting a radar signal based on the adjusted at least one parameter of the set of parameters.

In some examples, to support adjusting the at least one parameter of the set of parameters, the power component 745 may be configured as or otherwise support a means for adjusting a transmit power associated with the radar signal based on the determined distance between the first device and the second device satisfying a distance threshold. In some examples, to support adjusting the at least one parameter of the set of parameters, the radar component 740 may be configured as or otherwise support a means for transmitting the radar signal based on the adjusted transmit power.

In some examples, to support adjusting the at least one parameter of the set of parameters, the carrier component 750 may be configured as or otherwise support a means for adjusting a carrier frequency of a component carrier associated with radar-based sensing by the first device based on the determined distance between the first device and the second device satisfying a distance threshold. In some examples, to support adjusting the at least one parameter of the set of parameters, the radar component 740 may be configured as or otherwise support a means for transmitting the radar signal based on the adjusted carrier frequency of the component carrier. In some examples, to support adjusting the carrier frequency of the component carrier, the carrier component 750 may be configured as or otherwise support a means for selecting a lower carrier frequency compared to a current carrier frequency of the component carrier associated with radar-based sensing by the first device.

In some examples, to support adjusting the at least one parameter of the set of parameters, the radio frequency component 755 may be configured as or otherwise support a means for adjusting a number of radio frequency chains associated with radar-based sensing by the first device based on the determined distance between the first device and the second device satisfying a distance threshold. In some examples, to support adjusting the at least one parameter of the set of parameters, the radar component 740 may be configured as or otherwise support a means for transmitting the radar signal based on the adjusted number of radio frequency chains. In some examples, to support adjusting the number of radio frequency chains, the radio frequency component 755 may be configured as or otherwise support a means for increasing the number of radio frequency chains associated with radar-based sensing by the first device.

In some examples, to support adjusting the at least one parameter of the set of parameters, the rate component 760 may be configured as or otherwise support a means for adjusting a rate associated with radar-based sensing by the first device based on the determined distance between the first device and the second device satisfying a distance threshold. In some examples, to support adjusting the at least one parameter of the set of parameters, the radar component 740 may be configured as or otherwise support a means for transmitting the radar signal based on the adjusted rate. In some examples, to support adjusting the rate, the rate component 760 may be configured as or otherwise support a means for increasing the rate associated with radar-based sensing by the first device.

In some examples, to support adjusting the at least one parameter of the set of parameters, the bandwidth component 765 may be configured as or otherwise support a means for adjusting a bandwidth associated with radar-based sensing by the first device based on the determined distance between the first device and the second device satisfying a distance threshold. In some examples, to support adjusting the at least one parameter of the set of parameters, the radar component 740 may be configured as or otherwise support a means for transmitting the radar signal based on the adjusted bandwidth. In some examples, to support adjusting the bandwidth, the bandwidth component 765 may be configured as or otherwise support a means for increasing the bandwidth associated with radar-based sensing by the first device.

In some examples, to support adjusting the at least one parameter of the set of parameters, the beam component 770 may be configured as or otherwise support a means for adjusting a beam width associated with the radar signal based on the determined distance between the first device and the second device satisfying a distance threshold. In some examples, to support adjusting the at least one parameter of the set of parameters, the radar component 740 may be configured as or otherwise support a means for transmitting the radar signal based on the adjusted beam width.

In some examples, the location component 775 may be configured as or otherwise support a means for identifying a geolocation of the second device and a velocity of the second device based on the received radio frequency broadcast message. In some examples, the parameter component 735 may be configured as or otherwise support a means for adjusting the at least one parameter of the set of parameters associated with radar-based sensing by the first device based on the identified geolocation of the second device and the identified velocity of the second device.

In some examples, to support adjusting the at least one parameter of the set of parameters, the radar component 740 may be configured as or otherwise support a means for adjusting a pulse repetition interval of a radar associated with radar-based sensing by the first device based on the identified geolocation of the second device and the identified velocity of the second device, the radar including a pulse radar or a frequency modulated continuous wave radar. In some examples, to support adjusting the at least one parameter of the set of parameters, the radar component 740 may be configured as or otherwise support a means for transmitting the radar signal based on the adjusted pulse repetition interval. In some examples, the location component 775 may be configured as or otherwise support a means for identifying a positioning accuracy of the second device based on the received radio frequency broadcast message. In some examples, the parameter component 735 may be configured as or otherwise support a means for adjusting the at least one parameter of the set of parameters associated with radar-based sensing by the first device based on the identified positioning accuracy.

In some examples, to support adjusting the at least one parameter of the set of parameters, the beam component 770 may be configured as or otherwise support a means for adjusting a transmit beam associated with radar-based sensing by the first device based on the identified positioning accuracy of the second device satisfying a positioning accuracy error threshold. In some examples, to support adjusting the at least one parameter of the set of parameters, the radar component 740 may be configured as or otherwise support a means for transmitting the radar signal based on the adjusted transmit beam. In some examples, to support adjusting the transmit beam, the beam component 770 may be configured as or otherwise support a means for adjusting a gain of the transmit beam associated with radar-based sensing by the first device based on the identified positioning accuracy of the second device satisfying the positioning accuracy error threshold.

In some examples, the parameter component 735 may be configured as or otherwise support a means for identifying one or more of a user type associated with the second device, an activity associated with the second device, a number of devices in a cluster of devices including the second device, a dimension of a user associated with the second device, or a behavior of the user associated with the second device. In some examples, the parameter component 735 may be configured as or otherwise support a means for where adjusting the at least one parameter of the set of parameters is based on the one or more of the identified user type associated with the second device, the identified activity associated with the second device, the identified number of devices in the cluster of devices including the second device, the identified dimension of the user associated with the second device, or the identified behavior of the user associated with the second device.

In some examples, to support adjusting the at least one parameter of the set of parameters, the parameter component 735 may be configured as or otherwise support a means for adjusting one or more of a rate or a transmit power for a radar associated with radar-based sensing by the first device based on one or more of the identified user type associated with the second device, the identified dimension of the user associated with the second device, or the identified behavior of the user associated with the second device. In some examples, to support adjusting the at least one parameter of the set of parameters, the radar component 740 may be configured as or otherwise support a means for transmitting the radar signal based on the adjusted transmit power.

In some examples, to support adjusting the at least one parameter of the set of parameters, the parameter component 735 may be configured as or otherwise support a means for adjusting a coherent processing interval associated with radar-based sensing by the first device based at least in part the identified user type associated with the second device. In some examples, to support adjusting the at least one parameter of the set of parameters, the radar component 740 may be configured as or otherwise support a means for transmitting the radar signal based on the adjusted coherent processing interval.

In some examples, to support adjusting the at least one parameter of the set of parameters, the parameter component 735 may be configured as or otherwise support a means for adjusting a field-of-view for a radar associated with radar-based sensing by the first device based on the identified user type associated with the second device, the identified activity associated with the second device, or the identified number of devices in the cluster of devices. In some examples, to support adjusting the at least one parameter of the set of parameters, the radar component 740 may be configured as or otherwise support a means for transmitting the radar signal based on the adjusted field-of-view for the radar associated with radar-based sensing by the first device.

In some examples, the parameter component 735 may be configured as or otherwise support a means for identifying, based on the received radio frequency broadcast message, one or more of a velocity of the second device, an acceleration of the second device, a heading of the second device, a path history of the second device, or a path prediction of the second device. In some examples, the parameter component 735 may be configured as or otherwise support a means for selecting a sequence for adjusting one or more parameters of the set of parameters associated with radar-based sensing by the first device based on one or more of the identified velocity of the second device, the identified acceleration of the second device, the identified heading of the second device, the identified path history of the second device, or the identified path prediction of the second device. In some examples, the parameter component 735 may be configured as or otherwise support a means for adjusting the at least one parameter of the set of parameters based on the selected sequence.

In some examples, the parameter component 735 may be configured as or otherwise support a means for identifying, based on the received radio frequency broadcast message, one or more of a personal crossing request or a personal crossing in progress. In some examples, the parameter component 735 may be configured as or otherwise support a means for adjusting the at least one parameter of the set of parameters based on one or more of the identified personal crossing request or the identified personal crossing in progress.

In some examples, the wireless communications system includes a C-V2X system. In some examples, the radio frequency broadcast message includes a C-V2X message. In some examples, the C-V2X message includes a public safety message. In some examples, the first device includes a vehicle and the second device includes a UE associated with a VRU.

Figure 8:
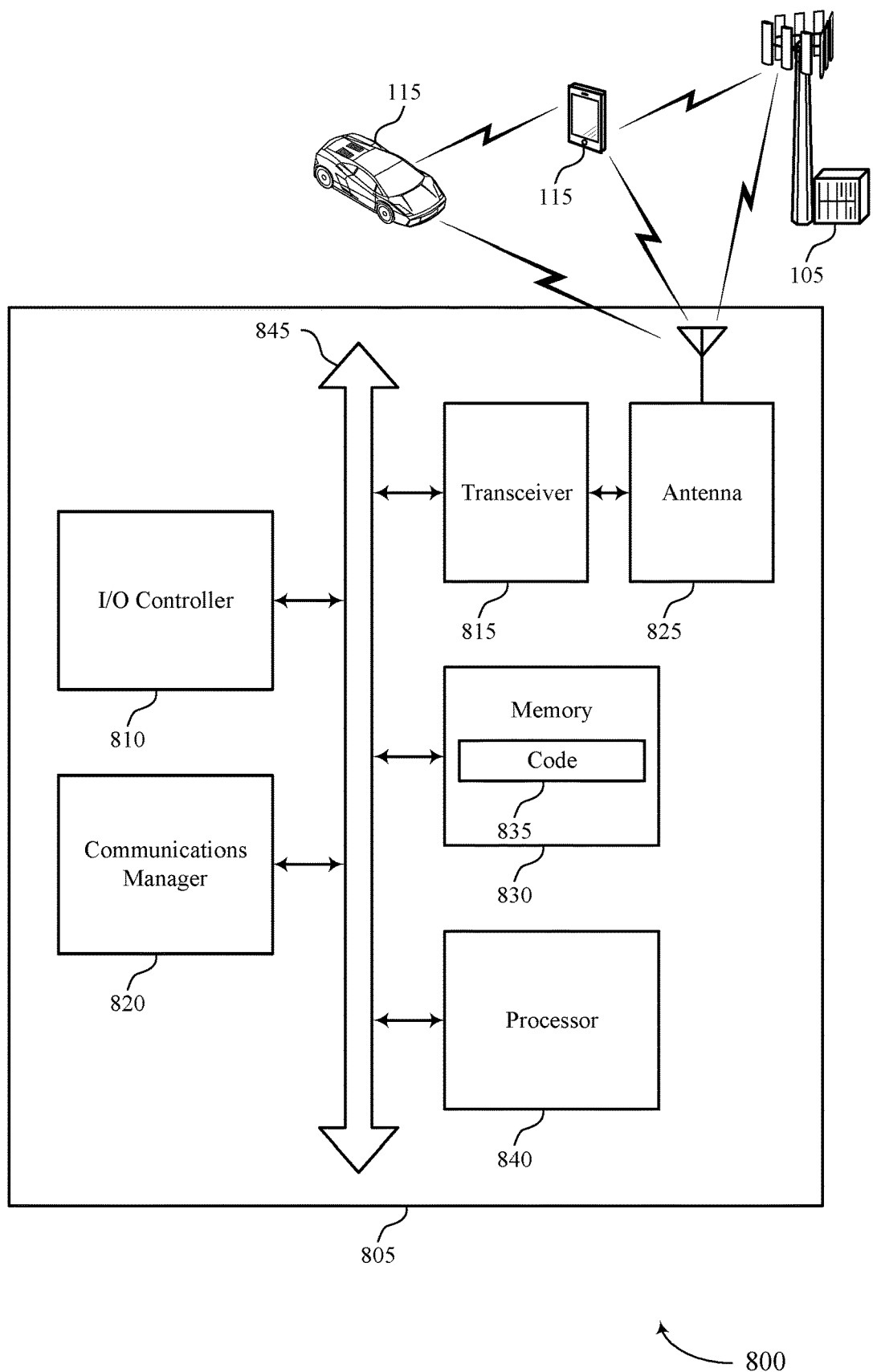
FIG. 8 shows a diagram of a system including a device that supports adaptive radar with public safety message integration in accordance with aspects of the present disclosure.

FIG. 8 shows a diagram of a system 800 including a device 805 that supports adaptive radar with public safety message integration in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting adaptive radar with public safety message integration). For example, the device 805 or a component of the device 805 may include a processor 840 and memory 830 coupled to the processor 840, the processor 840 and memory 830 configured to perform various functions described herein.

The communications manager 820 may support wireless communication at the device 805 (e.g., a first device) in a wireless communications system in accordance with examples as disclosed herein. For example, the communications manager 820 may be configured as or otherwise support a means for receiving, from a second device in the wireless communications system, a radio frequency broadcast message indicating a presence of the second device. The communications manager 820 may be configured as or otherwise support a means for determining a distance between the first device and the second device based on the radio frequency broadcast message. The communications manager 820 may be configured as or otherwise support a means for adjusting, basing at least in part on the determined distance between the first device and the second device, at least one parameter of a set of parameters associated with radar-based sensing by the first device. The communications manager 820 may be configured as or otherwise support a means for transmitting a radar signal based on the adjusted at least one parameter of the set of parameters.

By including or configuring the communications manager 820 in accordance with examples as described herein, the device 805 may support techniques for reduced latency and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of adaptive radar with public safety message integration as described herein, or the processor 840 and the memory 830 may be otherwise configured to perform or support such operations.

Figure 9:
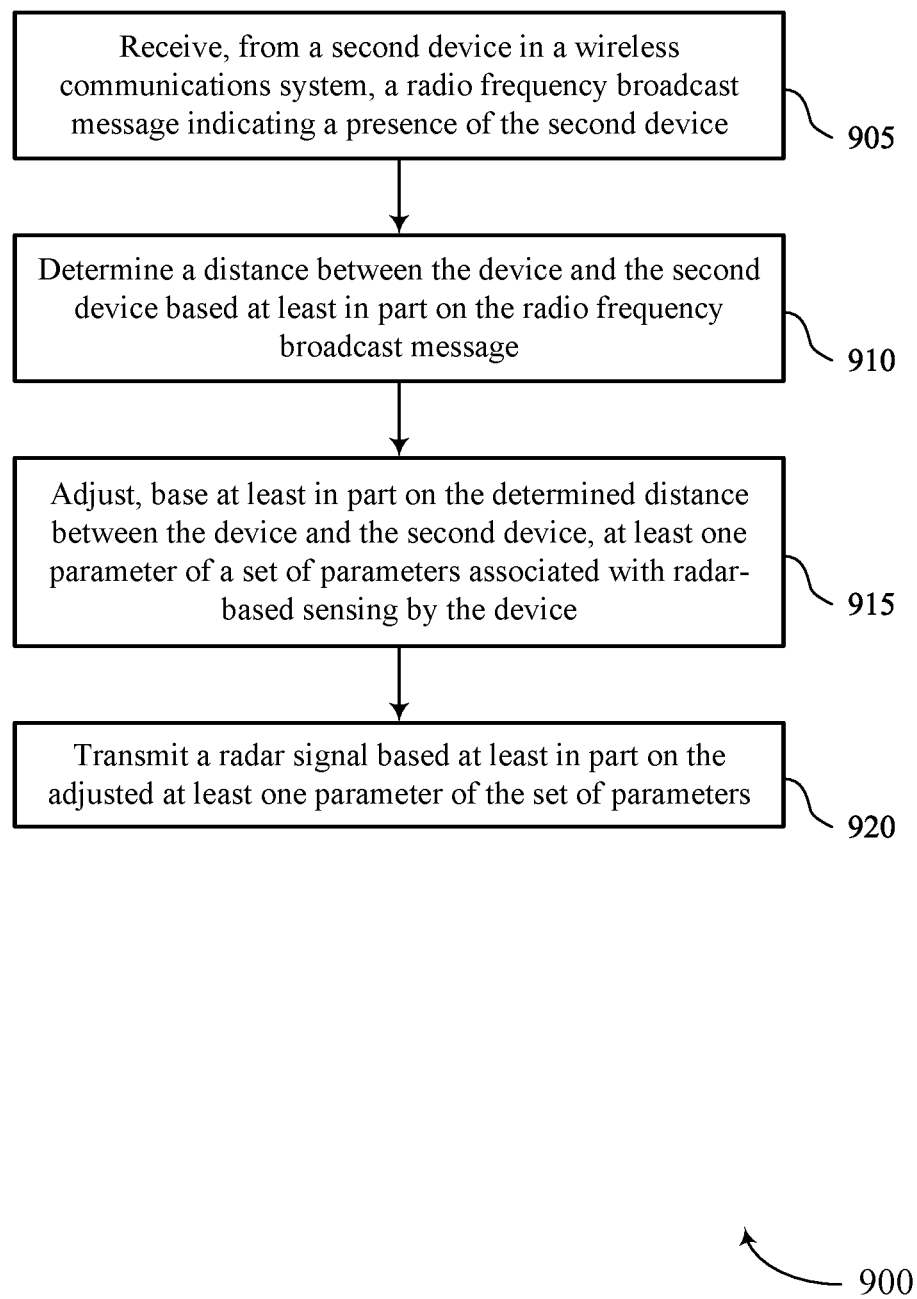
FIGS. 9 through 12 show flowcharts illustrating methods that support adaptive radar with public safety message integration in accordance with aspects of the present disclosure.

FIG. 9 shows a flowchart illustrating a method 900 that supports adaptive radar with public safety message integration in accordance with aspects of the present disclosure. The operations of the method 900 may be implemented by a device or its components as described herein. For example, the operations of the method 900 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 905, the method may include receiving, from a second device in a wireless communications system, a radio frequency broadcast message indicating a presence of the second device. The operations of 905 may be performed in accordance with examples as disclosed herein. In some examples, aspects of the operations of 905 may be performed by a message component 725 as described with reference to FIG. 7.

At 910, the method may include determining a distance between the device and the second device based on the radio frequency broadcast message. The operations of 910 may be performed in accordance with examples as disclosed herein. In some examples, aspects of the operations of 910 may be performed by a distance component 730 as described with reference to FIG. 7.

At 915, the method may include adjusting, based on the determined distance between the device and the second device, at least one parameter of a set of parameters associated with radar-based sensing by the device. The operations of 915 may be performed in accordance with examples as disclosed herein. In some examples, aspects of the operations of 915 may be performed by a parameter component 735 as described with reference to FIG. 7.

At 920, the method may include transmitting a radar signal based on the adjusted at least one parameter of the set of parameters. The operations of 920 may be performed in accordance with examples as disclosed herein. In some examples, aspects of the operations of 920 may be performed by a radar component 740 as described with reference to FIG. 7.

Figure 10:
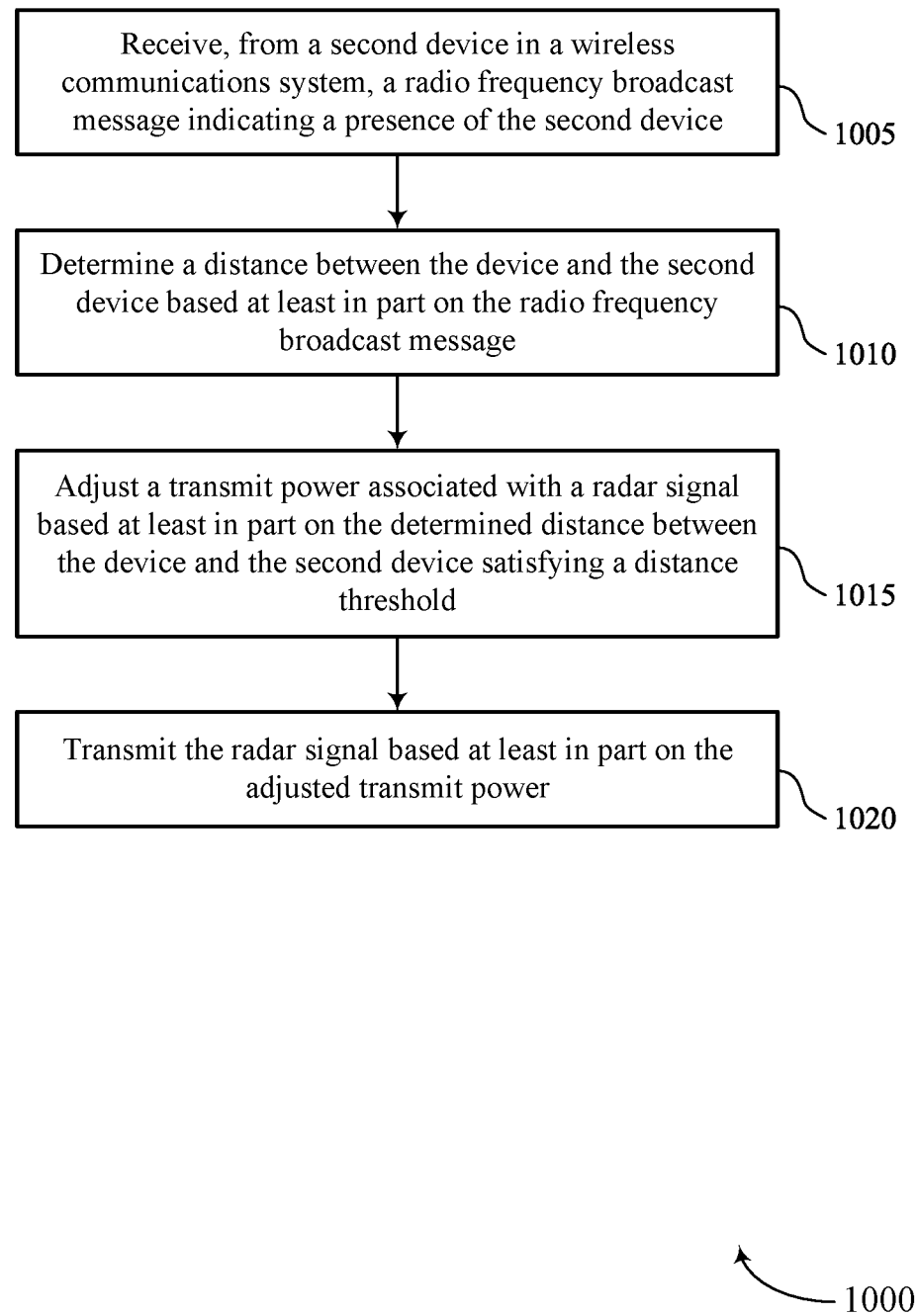

FIG. 10 shows a flowchart illustrating a method 1000 that supports adaptive radar with public safety message integration in accordance with aspects of the present disclosure. The operations of the method 1000 may be implemented by a device or its components as described herein. For example, the operations of the method 1000 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 1005, the method may include receiving, from a second device in a wireless communications system, a radio frequency broadcast message indicating a presence of the second device. The operations of 1005 may be performed in accordance with examples as disclosed herein. In some examples, aspects of the operations of 1005 may be performed by a message component 725 as described with reference to FIG. 7.

At 1010, the method may include determining a distance between the device and the second device based on the radio frequency broadcast message. The operations of 1010 may be performed in accordance with examples as disclosed herein. In some examples, aspects of the operations of 1010 may be performed by a distance component 730 as described with reference to FIG. 7.

At 1015, the method may include adjusting a transmit power associated with a radar signal based on the determined distance between the device and the second device satisfying a distance threshold. The operations of 1015 may be performed in accordance with examples as disclosed herein. In some examples, aspects of the operations of 1015 may be performed by a power component 745 as described with reference to FIG. 7.

At 1020, the method may include transmitting the radar signal based on the adjusted transmit power. The operations of 1020 may be performed in accordance with examples as disclosed herein. In some examples, aspects of the operations of 1020 may be performed by a radar component 740 as described with reference to FIG. 7.

Figure 11:
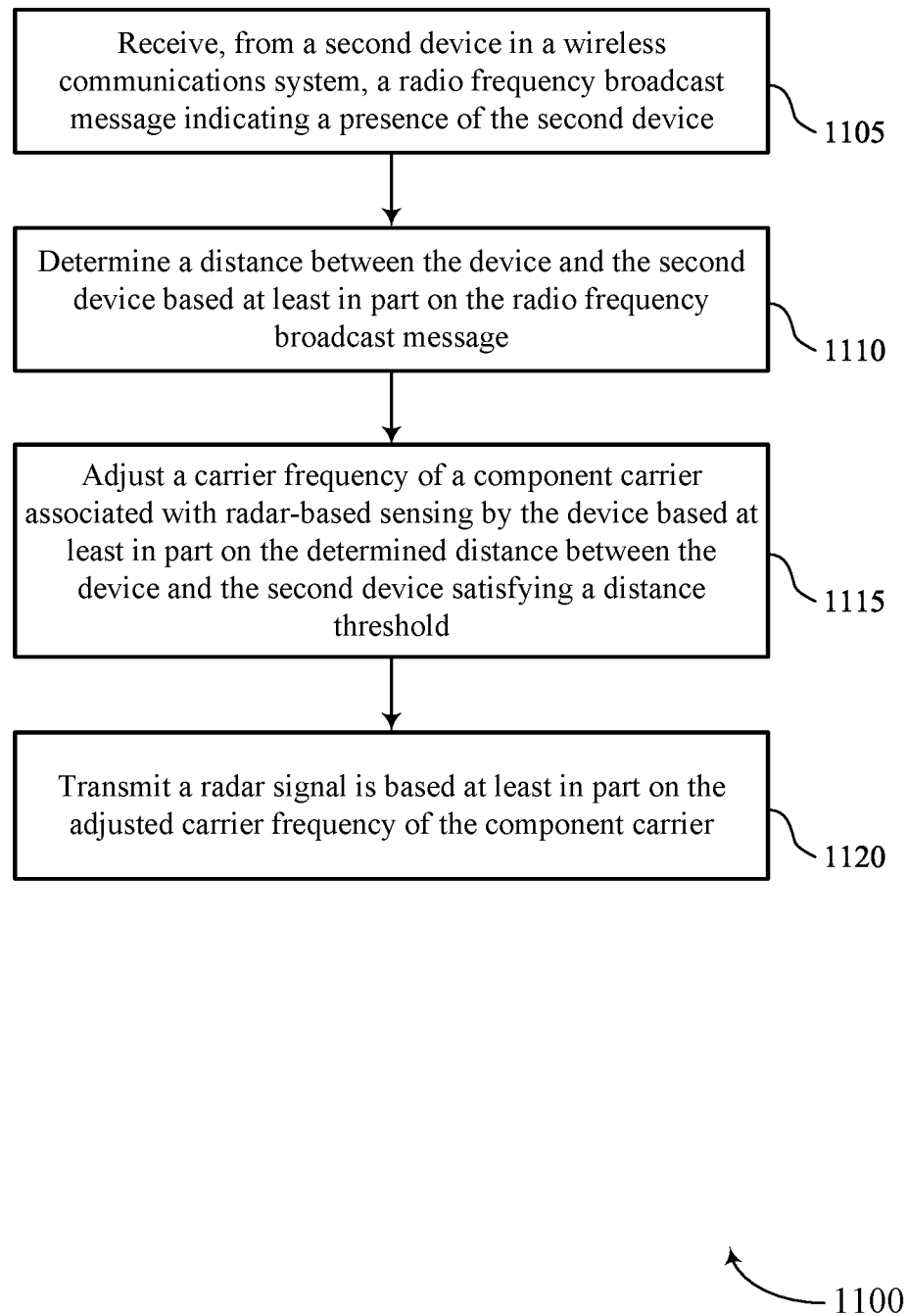

FIG. 11 shows a flowchart illustrating a method 1100 that supports adaptive radar with public safety message integration in accordance with aspects of the present disclosure. The operations of the method 1100 may be implemented by a device or its components as described herein. For example, the operations of the method 1100 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 1105, the method may include receiving, from a second device in a wireless communications system, a radio frequency broadcast message indicating a presence of the second device. The operations of 1105 may be performed in accordance with examples as disclosed herein. In some examples, aspects of the operations of 1105 may be performed by a message component 725 as described with reference to FIG. 7.

At 1110, the method may include determining a distance between the device and the second device based on the radio frequency broadcast message. The operations of 1110 may be performed in accordance with examples as disclosed herein. In some examples, aspects of the operations of 1110 may be performed by a distance component 730 as described with reference to FIG. 7.

At 1115, the method may include adjusting a carrier frequency of a component carrier associated with radar-based sensing by the device based on the determined distance between the device and the second device satisfying a distance threshold. The operations of 1115 may be performed in accordance with examples as disclosed herein. In some examples, aspects of the operations of 1115 may be performed by a carrier component 750 as described with reference to FIG. 7.

At 1120, the method may include transmitting a radar signal based on the adjusted carrier frequency of the component carrier. The operations of 1120 may be performed in accordance with examples as disclosed herein. In some examples, aspects of the operations of 1120 may be performed by a radar component 740 as described with reference to FIG. 7.

Figure 12:
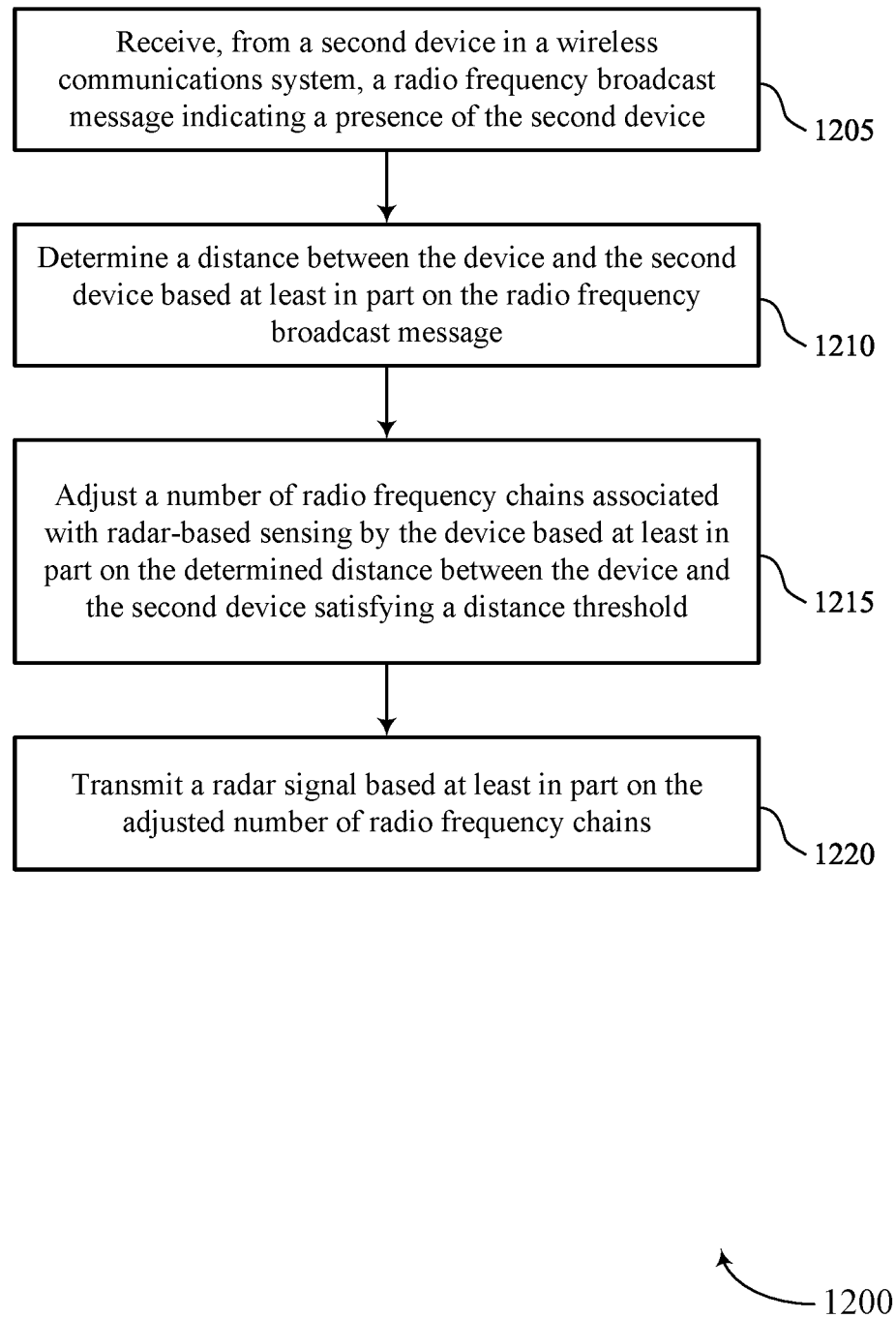

FIG. 12 shows a flowchart illustrating a method 1200 that supports adaptive radar with public safety message integration in accordance with aspects of the present disclosure. The operations of the method 1200 may be implemented by a device or its components as described herein. For example, the operations of the method 1200 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 1205, the method may include receiving, from a second device in a wireless communications system, a radio frequency broadcast message indicating a presence of the second device. The operations of 1205 may be performed in accordance with examples as disclosed herein. In some examples, aspects of the operations of 1205 may be performed by a message component 725 as described with reference to FIG. 7.

At 1210, the method may include determining a distance between the device and the second device based on the radio frequency broadcast message. The operations of 1210 may be performed in accordance with examples as disclosed herein. In some examples, aspects of the operations of 1210 may be performed by a distance component 730 as described with reference to FIG. 7.

At 1215, the method may include adjusting a number of radio frequency chains associated with radar-based sensing by the device based on the determined distance between the device and the second device satisfying a distance threshold. The operations of 1215 may be performed in accordance with examples as disclosed herein. In some examples, aspects of the operations of 1215 may be performed by a radio frequency component 755 as described with reference to FIG. 7.

At 1220, the method may include transmitting a radar signal based on the adjusted number of radio frequency chains. The operations of 1220 may be performed in accordance with examples as disclosed herein. In some examples, aspects of the operations of 1220 may be performed by a radar component 740 as described with reference to FIG. 7.

The following provides an overview of aspects of the present disclosure:

Aspect 1: A method for wireless communication at a first device in a wireless communications system, comprising: receiving, from a second device in the wireless communications system, a radio frequency broadcast message indicating a presence of the second device; determining a distance between the first device and the second device based at least in part on the radio frequency broadcast message; adjusting, based at least in part on the determined distance between the first device and the second device, at least one parameter of a set of parameters associated with radar-based sensing by the first device; and transmitting a radar signal based at least in part on the adjusted at least one parameter of the set of parameters.

Aspect 2: The method of aspect 1, wherein adjusting the at least one parameter of the set of parameters comprises: adjusting a transmit power associated with the radar signal based at least in part on the determined distance between the first device and the second device satisfying a distance threshold, wherein transmitting the radar signal is based at least in part on the adjusted transmit power.

Aspect 3: The method of any of aspects 1 through 2, wherein adjusting the at least one parameter of the set of parameters comprises: adjusting a carrier frequency of a component carrier associated with radar-based sensing by the first device based at least in part on the determined distance between the first device and the second device satisfying a distance threshold, wherein transmitting the radar signal is based at least in part on the adjusted carrier frequency of the component carrier.

Aspect 4: The method of aspect 3, wherein adjusting the carrier frequency of the component carrier comprises: selecting a lower carrier frequency compared to a current carrier frequency of the component carrier associated with radar-based sensing by the first device.

Aspect 5: The method of any of aspects 1 through 4, wherein adjusting the at least one parameter of the set of parameters comprises: adjusting a number of radio frequency chains associated with radar-based sensing by the first device based at least in part on the determined distance between the first device and the second device satisfying a distance threshold, wherein transmitting the radar signal is based at least in part on the adjusted number of radio frequency chains.

Aspect 6: The method of aspect 5, wherein adjusting the number of radio frequency chains comprises: increasing the number of radio frequency chains associated with radar-based sensing by the first device.

Aspect 7: The method of any of aspects 1 through 6, wherein adjusting the at least one parameter of the set of parameters comprises: adjusting a rate associated with radar-based sensing by the first device based at least in part on the determined distance between the first device and the second device satisfying a distance threshold, wherein transmitting the radar signal is based at least in part on the adjusted rate.

Aspect 8: The method of aspect 7, wherein adjusting the rate comprises: increasing the rate associated with radar-based sensing by the first device.

Aspect 9: The method of any of aspects 1 through 8, wherein adjusting the at least one parameter of the set of parameters comprises: adjusting a bandwidth associated with radar-based sensing by the first device based at least in part on the determined distance between the first device and the second device satisfying a distance threshold, wherein transmitting the radar signal is based at least in part on the adjusted bandwidth.

Aspect 10: The method of aspect 9, wherein adjusting the bandwidth comprises: increasing the bandwidth associated with radar-based sensing by the first device.

Aspect 11: The method of any of aspects 1 through 10, wherein adjusting the at least one parameter of the set of parameters comprises: adjusting a beam width associated with the radar signal based at least in part on the determined distance between the first device and the second device satisfying a distance threshold, wherein transmitting the radar signal is based at least in part on the adjusted beam width.

Aspect 12: The method of any of aspects 1 through 11, further comprising: identifying a geolocation of the second device and a velocity of the second device based at least in part on the received radio frequency broadcast message, wherein adjusting the at least one parameter of the set of parameters associated with radar-based sensing by the first device is based at least in part on the identified geolocation of the second device and the identified velocity of the second device.

Aspect 13: The method of aspect 12, wherein adjusting the at least one parameter of the set of parameters comprises: adjusting a pulse repetition interval of a radar associated with radar-based sensing by the first device based at least in part on the identified geolocation of the second device and the identified velocity of the second device, the radar comprising a pulse radar or a frequency modulated continuous wave radar, wherein transmitting the radar signal is based at least in part on the adjusted pulse repetition interval.

Aspect 14: The method of any of aspects 1 through 13, further comprising: identifying a positioning accuracy of the second device based at least in part on the received radio frequency broadcast message, wherein adjusting the at least one parameter of the set of parameters associated with radar-based sensing by the first device is based at least in part on the identified positioning accuracy.

Aspect 15: The method of aspect 14, wherein adjusting the at least one parameter of the set of parameters comprises: adjusting a transmit beam associated with radar-based sensing by the first device based at least in part on the identified positioning accuracy of the second device satisfying a positioning accuracy error threshold, wherein transmitting the radar signal is based at least in part on the adjusted transmit beam.

Aspect 16: The method of any of aspects 14 through 15, wherein adjusting the transmit beam comprises: adjusting a gain of the transmit beam associated with radar-based sensing by the first device based at least in part on the identified positioning accuracy of the second device satisfying the positioning accuracy error threshold.

Aspect 17: The method of any of aspects 1 through 16, further comprising: identifying one or more of a user type associated with the second device, an activity associated with the second device, a number of devices in a cluster of devices including the second device, a dimension of a user associated with the second device, or a behavior of the user associated with the second device, wherein adjusting the at least one parameter of the set of parameters is based at least in part on the one or more of the identified user type associated with the second device, the identified activity associated with the second device, the identified number of devices in the cluster of devices including the second device, the identified dimension of the user associated with the second device, or the identified behavior of the user associated with the second device.

Aspect 18: The method of aspect 17, wherein adjusting the at least one parameter of the set of parameters comprises: adjusting one or more of a rate or a transmit power for a radar associated with radar-based sensing by the first device based at least in part on one or more of the identified user type associated with the second device, the identified dimension of the user associated with the second device, or the identified behavior of the user associated with the second device, wherein transmitting the radar signal is based at least in part on the adjusted transmit power.

Aspect 19: The method of any of aspects 17 through 18, wherein adjusting the at least one parameter of the set of parameters comprises: adjusting a coherent processing interval associated with radar-based sensing by the first device based at least in part the identified user type associated with the second device, wherein transmitting the radar signal is based at least in part on the adjusted coherent processing interval.

Aspect 20: The method of any of aspects 17 through 19, wherein adjusting the at least one parameter of the set of parameters comprises: adjusting a field-of-view for a radar associated with radar-based sensing by the first device based at least in part on the identified user type associated with the second device, the identified activity associated with the second device, or the identified number of devices in the cluster of devices, wherein transmitting the radar signal is based at least in part on the adjusted field-of-view for the radar associated with radar-based sensing by the first device.

Aspect 21: The method of any of aspects 1 through 20, further comprising: identifying, based at least in part on the received radio frequency broadcast message, one or more of a velocity of the second device, an acceleration of the second device, a heading of the second device, a path history of the second device, or a path prediction of the second device; selecting a sequence for adjusting one or more parameters of the set of parameters associated with radar-based sensing by the first device based at least in part on one or more of the identified velocity of the second device, the identified acceleration of the second device, the identified heading of the second device, the identified path history of the second device, or the identified path prediction of the second device, wherein adjusting the at least one parameter of the set of parameters is based at least in part on the selected sequence.

Aspect 22: The method of any of aspects 1 through 21, further comprising: identifying, based at least in part on the received radio frequency broadcast message, one or more of a personal crossing request or a personal crossing in progress, wherein adjusting the at least one parameter of the set of parameters is based at least in part on one or more of the identified personal crossing request or the identified personal crossing in progress.

Aspect 23: The method of any of aspects 1 through 22, wherein the wireless communications system comprises a C-V2X system.

Aspect 24: The method of any of aspects 1 through 23, wherein the radio frequency broadcast message comprises a C-V2X message.

Aspect 25: The method of aspect 24, wherein the C-V2X message comprises a public safety message.

Aspect 26: The method of any of aspects 1 through 25, wherein the first device comprises a vehicle and the second device comprises a UE associated with a VRU.

Aspect 27: An apparatus for wireless communication at a first device in a wireless communications system, comprising a processor; memory coupled with the processor; and instructions stored in the memory and executable by the processor to cause the apparatus to perform a method of any of aspects 1 through 26.

Aspect 28: An apparatus for wireless communication at a first device in a wireless communications system, comprising at least one means for performing a method of any of aspects 1 through 26.

Aspect 29: A non-transitory computer-readable medium storing code for wireless communication at a first device in a wireless communications system, the code comprising instructions executable by a processor to perform a method of any of aspects 1 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device in a wireless communications system, comprising:

receiving, from a second device in the wireless communications system, a radio frequency broadcast message indicating a presence of the second device;
identifying a positioning accuracy of the second device based at least in part on the received radio frequency broadcast message;
determining a distance between the first device and the second device based at least in part on the radio frequency broadcast message;
adjusting, based at least in part on the determined distance between the first device and the second device and further based at least in part on the identified positioning accuracy, at least one parameter of a set of parameters associated with radar-based sensing by the first device; and
transmitting a radar signal based at least in part on the adjusted at least one parameter of the set of parameters.

2. The method of claim 1, wherein adjusting the at least one parameter of the set of parameters comprises:
adjusting a transmit power associated with the radar signal based at least in part on the determined distance between the first device and the second device satisfying a distance threshold,
wherein transmitting the radar signal is based at least in part on the adjusted transmit power.

3. The method of claim 1, wherein adjusting the at least one parameter of the set of parameters comprises:
adjusting a carrier frequency of a component carrier associated with radar-based sensing by the first device based at least in part on the determined distance between the first device and the second device satisfying a distance threshold,
wherein transmitting the radar signal is based at least in part on the adjusted carrier frequency of the component carrier.

4. The method of claim 3, wherein adjusting the carrier frequency of the component carrier comprises:
selecting a lower carrier frequency compared to a current carrier frequency of the component carrier associated with radar-based sensing by the first device.

5. The method of claim 1, wherein adjusting the at least one parameter of the set of parameters comprises:
adjusting a number of radio frequency chains associated with radar-based sensing by the first device based at least in part on the determined distance between the first device and the second device satisfying a distance threshold,
wherein transmitting the radar signal is based at least in part on the adjusted number of radio frequency chains.

6. The method of claim 5, wherein adjusting the number of radio frequency chains comprises:
increasing the number of radio frequency chains associated with radar-based sensing by the first device.

7. The method of claim 1, wherein adjusting the at least one parameter of the set of parameters comprises:
adjusting a rate associated with radar-based sensing by the first device based at least in part on the determined distance between the first device and the second device satisfying a distance threshold,
wherein transmitting the radar signal is based at least in part on the adjusted rate.

8. The method of claim 7, wherein adjusting the rate comprises:
increasing the rate associated with radar-based sensing by the first device.

9. The method of claim 1, wherein adjusting the at least one parameter of the set of parameters comprises:

adjusting a bandwidth associated with radar-based sensing by the first device based at least in part on the determined distance between the first device and the second device satisfying a distance threshold,
wherein transmitting the radar signal is based at least in part on the adjusted bandwidth.

10. The method of claim 9, wherein adjusting the bandwidth comprises:
increasing the bandwidth associated with radar-based sensing by the first device.

11. The method of claim 1, wherein adjusting the at least one parameter of the set of parameters comprises:
adjusting a beam width associated with the radar signal based at least in part on the determined distance between the first device and the second device satisfying a distance threshold,
wherein transmitting the radar signal is based at least in part on the adjusted beam width.

12. The method of claim 1, further comprising:
identifying a geolocation of the second device and a velocity of the second device based at least in part on the received radio frequency broadcast message,
wherein adjusting the at least one parameter of the set of parameters associated with radar-based sensing by the first device is based at least in part on the identified geolocation of the second device and the identified velocity of the second device.

13. The method of claim 12, wherein adjusting the at least one parameter of the set of parameters comprises:
adjusting a pulse repetition interval of a radar associated with radar-based sensing by the first device based at least in part on the identified geolocation of the second device and the identified velocity of the second device, the radar comprising a pulse radar or a frequency modulated continuous wave radar,
wherein transmitting the radar signal is based at least in part on the adjusted pulse repetition interval.

14. The method of claim 1, wherein adjusting the at least one parameter of the set of parameters comprises:
adjusting a transmit beam associated with radar-based sensing by the first device based at least in part on the identified positioning accuracy of the second device satisfying a positioning accuracy error threshold,
wherein transmitting the radar signal is based at least in part on the adjusted transmit beam.

15. The method of claim 14, wherein adjusting the transmit beam comprises:
adjusting a gain of the transmit beam associated with radar-based sensing by the first device based at least in part on the identified positioning accuracy of the second device satisfying the positioning accuracy error threshold.

16. The method of claim 1, further comprising:
identifying one or more of a user type associated with the second device, an activity associated with the second device, a number of devices in a cluster of devices including the second device, a dimension of a user associated with the second device, or a behavior of the user associated with the second device,
wherein adjusting the at least one parameter of the set of parameters is based at least in part on the one or more of the identified user type associated with the second device, the identified activity associated with the second device, the identified number of devices in the cluster of devices including the second device, the identified dimension of the user associated with the second device, or the identified behavior of the user associated with the second device.

17. The method of claim 16, wherein adjusting the at least one parameter of the set of parameters comprises:
adjusting one or more of a rate or a transmit power for a radar associated with radar-based sensing by the first device based at least in part on one or more of the identified user type associated with the second device, the identified dimension of the user associated with the second device, or the identified behavior of the user associated with the second device,
wherein transmitting the radar signal is based at least in part on the adjusted transmit power.

18. The method of claim 16, wherein adjusting the at least one parameter of the set of parameters comprises:
adjusting a coherent processing interval associated with radar-based sensing by the first device based at least in part the identified user type associated with the second device,
wherein transmitting the radar signal is based at least in part on the adjusted coherent processing interval.

19. The method of claim 16, wherein adjusting the at least one parameter of the set of parameters comprises:
adjusting a field-of-view for a radar associated with radar-based sensing by the first device based at least in part on the identified user type associated with the second device, the identified activity associated with the second device, or the identified number of devices in the cluster of devices,
wherein transmitting the radar signal is based at least in part on the adjusted field-of-view for the radar associated with radar-based sensing by the first device.

20. The method of claim 1, further comprising:
identifying, based at least in part on the received radio frequency broadcast message, one or more of a velocity of the second device, an acceleration of the second device, a heading of the second device, a path history of the second device, or a path prediction of the second device;
selecting a sequence for adjusting one or more parameters of the set of parameters associated with radar-based sensing by the first device based at least in part on one or more of the identified velocity of the second device, the identified acceleration of the second device, the identified heading of the second device, the identified path history of the second device, or the identified path prediction of the second device,
wherein adjusting the at least one parameter of the set of parameters is based at least in part on the selected sequence.

21. The method of claim 1, further comprising:
identifying, based at least in part on the received radio frequency broadcast message, one or more of a personal crossing request or a personal crossing in progress,
wherein adjusting the at least one parameter of the set of parameters is based at least in part on one or more of the identified personal crossing request or the identified personal crossing in progress.

22. The method of claim 1, wherein the wireless communications system comprises a cellular vehicle-to-everything (C-V2X) system.

23. The method of claim 1, wherein the radio frequency broadcast message comprises a cellular vehicle-to-everything (C-V2X) message.

24. The method of claim 23, wherein the C-V2X message comprises a public safety message.

25. The method of claim 1, wherein the first device comprises a vehicle.

26. The method of claim 1, wherein the second device comprises a user equipment (UE) associated with a vulnerable road user (VRU).

27. An apparatus for wireless communication at a first device in a wireless communications system, comprising:
a processor;
memory coupled with the processor; and
instructions stored in the memory and executable by the processor to cause the apparatus to:
receive, from a second device in the wireless communications system, a radio frequency broadcast message indicating a presence of the second device;
identify a positioning accuracy of the second device based at least in part on the received radio frequency broadcast message;
determine a distance between the first device and the second device based at least in part on the radio frequency broadcast message;
adjust, based at least in part on the determined distance between the first device and the second device and further based at least in part on the identified positioning accuracy, at least one parameter of a set of parameters associated with radar-based sensing by the first device; and
transmit a radar signal based at least in part on the adjusted at least one parameter of the set of parameters.

28. An apparatus for wireless communication at a first device in a wireless communications system, comprising:
means for receiving, from a second device in the wireless communications system, a radio frequency broadcast message indicating a presence of the second device;
means for identifying a positioning accuracy of the second device based at least in part on the received radio frequency broadcast message;
means for determining a distance between the first device and the second device based at least in part on the radio frequency broadcast message;
means for adjusting, based at least in part on the determined distance between the first device and the second device and further based at least in part on the identified positioning accuracy, at least one parameter of a set of parameters associated with radar-based sensing by the first device; and
means for transmitting a radar signal based at least in part on the adjusted at least one parameter of the set of parameters.

29. A non-transitory computer-readable medium storing code for wireless communication at a first device in a wireless communications system, the code comprising instructions executable by a processor to:
receive, from a second device in the wireless communications system, a radio frequency broadcast message indicating a presence of the second device;
identify a positioning accuracy of the second device based at least in part on the received radio frequency broadcast message;
determine a distance between the first device and the second device based at least in part on the radio frequency broadcast message;
adjust, based at least in part on the determined distance between the first device and the second device and further based at least in part on the identified positioning accuracy, at least one parameter of a set of parameters associated with radar-based sensing by the first device; and transmit a radar signal based at least in part on the adjusted at least one parameter of the set of parameters.

* * * * *